United States Patent [19]
Barnett

[11] 3,861,847
[45] Jan. 21, 1975

[54] AUTOMATED BENDING AND BELLING OF PLASTIC PIPE

[76] Inventor: Louis H. Barnett, 3631 Encanto Dr., Forth Worth, Tex. 76109

[22] Filed: Feb. 19, 1974

[21] Appl. No.: 443,920

Related U.S. Application Data

[60] Continuation-in-part of Ser. Nos. 349,293, April 19, 1973, , and Ser. No. , , , Continuation-in-part of Ser. No. 358,160, May 7, 1973, which is a division of Ser. No. 127,931, March 25, 1971, Pat. No. 3,753,635.

[52] U.S. Cl................. 425/324, 425/384, 425/392, 425/393, 425/403, 425/387, 264/94, 264/339, 264/322
[51] Int. Cl............................................. B29c 17/02
[58] Field of Search .......... 425/324, 384, 392, 393, 425/403; 264/322, 327, 89, 94, 339

[56] References Cited
UNITED STATES PATENTS

| | | | |
|---|---|---|---|
| 1,877,629 | 9/1932 | Replogle | 264/94 X |
| 2,998,985 | 9/1961 | Burns et al. | 264/295 X |
| 3,044,117 | 7/1962 | Alspach et al. | 425/384 X |
| 3,184,796 | 5/1965 | Southcott et al. | 425/384 |
| 3,205,535 | 9/1965 | Niessner et al. | 425/393 X |
| 3,290,728 | 12/1966 | Pratt | 425/393 X |
| 3,484,900 | 12/1969 | Sands et al. | 425/393 |

Primary Examiner—Robert L. Spicer
Attorney, Agent, or Firm—Wofford, Felsman, Fails & Zobal

[57] ABSTRACT

The specification discloses a process and system for at least semi-automatically bending and belling segments of plastic pipe to form a desired elbow. Differential pressure is imposed across the walls of the segments by applying the fluid pressure to the interior or the pipe. The segment of the pipe is heated to its softening temperature and then belled and bent to a predetermined degree of bend while maintaining the differential pressure across the wall to form an elbow with a minimum of distortion of the side walls. Bending is carried out in conformance with a precision jig that forms a precise elbow. With the formed and belled elbow in the jig, it is cooled while maintaining the fluid pressure therewithin. The fluid pressure is then removed and the elbow released from the jig. An expansible mandrel is provided for semi-automatically belling the ends of the conduit.

19 Claims, 23 Drawing Figures

3,861,847

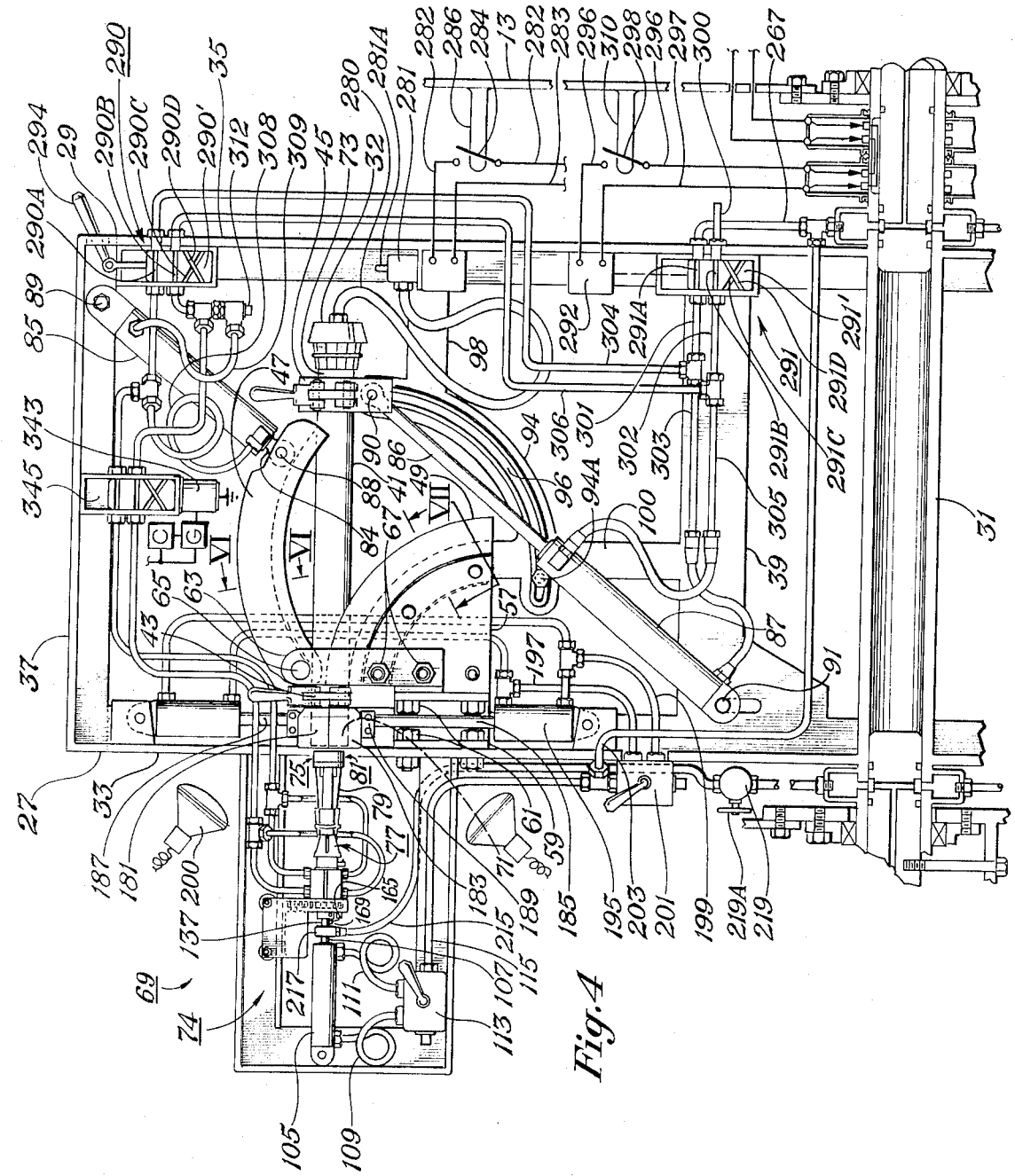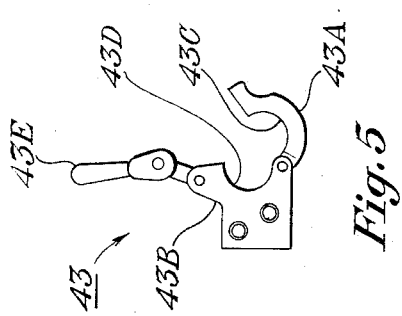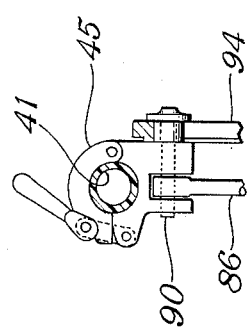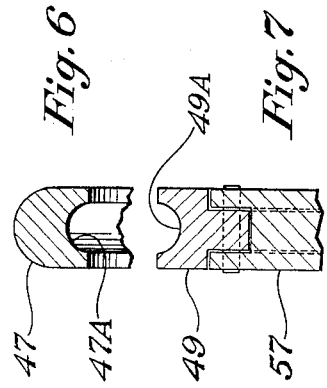

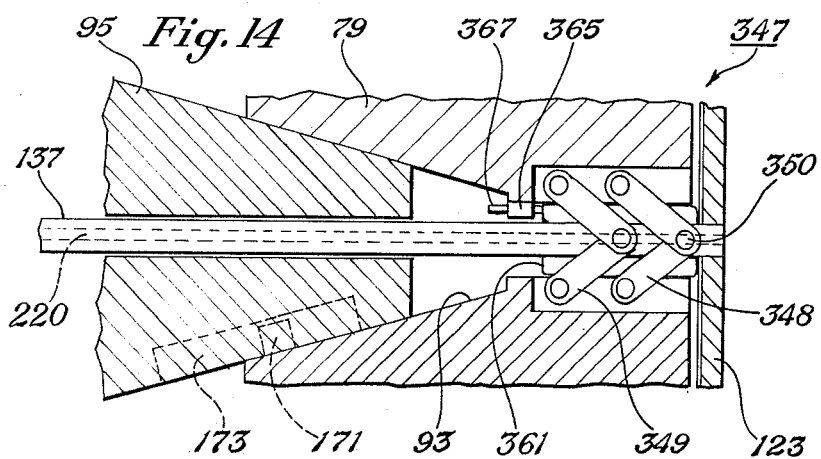
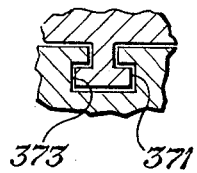
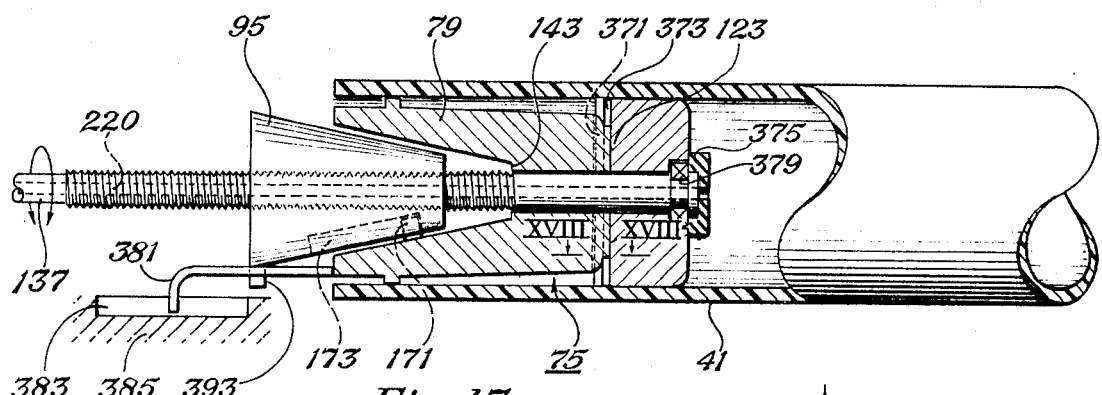
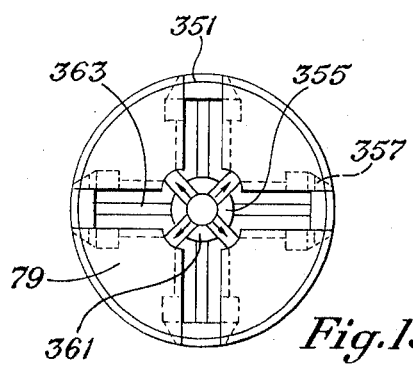
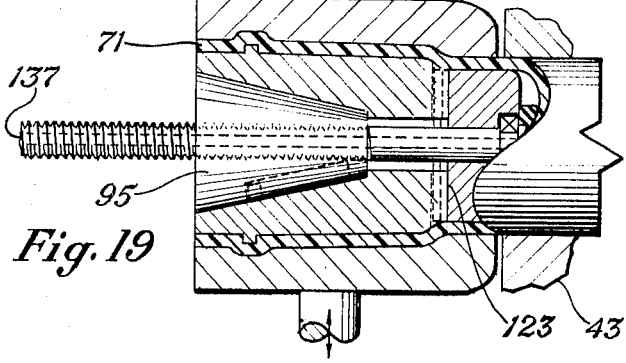
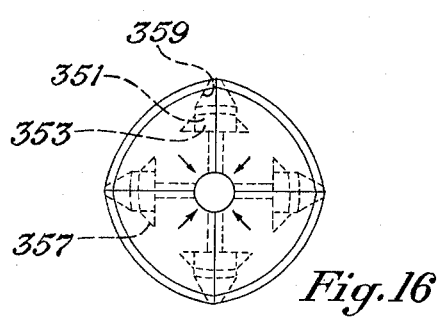
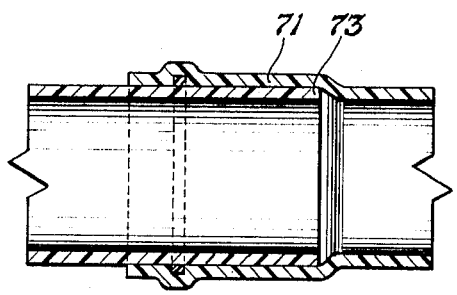

AUTOMATED BENDING AND BELLING OF PLASTIC PIPE

CROSS REFERENCE TO RELATED APPLICATIONS

This application is a continuation-in-part application of application Ser. No. 349,293, filed Apr. 9, 1973 (assigned to Group 322). This application is also a continuation-in-part application of application Ser. No. 358,160, filed May 7, 1973; that application being a divisional of patent application Ser. No. 127,931, filed Mar. 25, 1971, now issued as U.S. Pat. No. 3,753,635.

BACKGROUND OF THE INVENTION

1. Field of the Invention: This invention relates to the belling and bending of segments of plastic pipe. More particularly, it relates to belling and bending of segments of plastic pipe to form a predetermined elbow with a minimum distortion of the side walls.

2. Description of the Prior Art: As is well known, plastic pipe has been used increasingly for many applications; for example, for electrical conduits and for fluid flow conduits in many fields. Needed for this purpose are elbow segments bent to various angles for turning corners. Heretofore, the elbows have been formed by manually heating and bending the conduit segments to form each elbow. This has required skilled labor and has resulted in a poor quality control with a high rate of rejection. In my U.S. Pat. No. 3,753,635, I explained the problem in more detail and delineated an improved structure for at least semi-automatically and precisely bending the segments of plastic pipe to form the elbows. That descriptive matter is embodied herein by reference.

In addition, it has been found, in the larger sized plastic conduits at least, that it is preferable to employ a belled end on the conduit for more readily effecting a seal between respective ends of the plastic conduit. Either one or both the ends of the elbow may be belled. In my copending patent application Ser. No. 349,293, filed Apr. 9, 1973 and entitled "Apparatus for Belling Ends of Conduit or the Like," I delineated the problems with the prior art and an improvement employing an expansible mandrel for forming a belled end, particularly where a groove was desired to receive a seal means in sealing engagement with a second end inserted therewithin. For example, the prior art apparatus has generally been limited to conduit diameters in the range of 16–60 millimeters and has simply jammed a slick mandrel directly into the heated end of the conduit to form the belled end. Those skilled in this art will appreciate that ramming a mandrel into softened thermoplastic conduit presents a problem in the larger diameter sizes and is not feasibly operable when a groove is desired to be formed in the belled end to receive a seal means for sealing engagement with the second end of the conduit inserted therewithin. The seal means may comprise any of the conventional gaskets, or resilient seals of any desired cross sectional shape. For simplicity, o-rings will be described hereinafter as the illustrative embodiment of the seal means.

SUMMARY OF THE INVENTION

Consequently, it is an object of this invention to provide an improved apparatus for at least semi-automatically belling the ends of segments of conduit and semi-automatically bending the segments of conduit to form elbows or the like; all in a unitary apparatus or method that obviates the disadvantages of the prior art apparatus. The actual bending and belling is automatic, although an operator may control the overall operation.

It is also a specific object of this invention to provide apparatus for forming a precise elbow and employing a differential pressure across the walls thereof while at least semi-automatically bending and belling the segment of thermoplastic conduit of a relatively large size and forming a groove therein for receiving a seal means therewithin; all in a unitary method or apparatus that obviates the disadvantages of the prior art.

These and other objects will become apparent from the descriptive matter hereinafter, particularly when taken in conjunction with the drawings.

In accordance with the present invention there is provided a method and system for bending and belling plastic pipe or conduits into the form of a desired elbow with a minimum of distortion of the side walls. In carrying out the process, there is established a pressure differential across the walls of a segment of the conduit to be bent, the higher pressure being on the interior. The segment of conduit is heated to its softening temperature along a length sufficient for an arc of a desired degree of bend, as well as the end to be belled. An expansible mandrel that has been inserted in the end to be belled is expanded into a female mold to form the belled end of the desired shape and finish. While maintaining a pressure differential across the walls, the segment of conduit is bent, while at its softening temperature, to a precisely determined degree of bend in conformance with a jig means to form a precision elbow with a minimum of distortion of the side walls. The formed elbow is cooled while maintaining the pressure differential. The pressure then is equalized and the elbow is released from engagement with the jig. The expansible mandrel is retracted and removed.

The system for bending the plastic conduit to form the desired elbow comprises a differential pressure inducing means for establishing a pressure differential across the walls of a segment of conduit with the high pressure being on the interior thereof. The differential pressure inducing means is operable to maintain the differential pressure while the segment of conduit is being subjected to a heating means, a bending means and a cooling means. In the embodiment disclosed, the conduit is loaded in a jig assembly and rotated to a heating location; a heating, belling and bending location; and a cooling location to carry out the desired operations.

In one aspect, the pressure differential is established by imposing a superatmospheric pressure within the interior of the segment of conduit. In one embodiment, this pressure is obtained by applying gas under pressure to the interior of the segment of conduit. While under this pressure, the conduit is moved to a heating location and then to a heating, belling and bending location; each location having heating means for applying heat to the outer walls of the conduit. The formed elbow is then moved to a cooling location which comprises gas and liquid cooling means. Liquid cooling may be obtained with a bath or spray of cooled liquid. The cooled elbow then is moved to a loading and unloading location where the pressure is removed and the elbow removed from the jig, with the expansible mandrel being retracted from the belled end and withdrawn.

In a further aspect, similarly as described in the aforementioned U.S. Pat. No. 3,753,635, pressure is applied to the interior walls of the conduit by flowing the liquid through the conduit. Initially, a liquid hot enough to soften the plastic to its softening temperature is passed through the conduit. In this state, and while the hot liquid is flowing through the conduit, the conduit segment is belled and bent to form the desired elbow. Following bending, a cool liquid is passed through the conduit to cool and harden the plastic while maintained in the desired elbow configuration. Following cooling, the liquid flow is terminated and the formed elbow is removed from the system.

BRIEF DESCRIPTION OF THE DRAWINGS

FIG. 4 is a detailed illustration of one section of the rotating wheel of the system of FIGS. 1 and 2.

FIG. 5 illustrates a side view of one of the clamps employed in the section of FIG. 4.

FIG. 5A illustrates an end view of the movable clamp and arcuate guide of FIG. 4.

FIGS. 6 and 7 are cross sectional views of the jigs of FIG. 4 taken along the lines VI—VI and VII—VII thereof.

FIG. 14 is a partial side elevational view, partly in section, illustrating another embodiment of the expansible mandrel of this invention.

FIG. 15 is the end view of an expansible mandrel in accordance with another embodiment of this invention in its fully expanded position.

FIG. 16 is an end view of the expansible mandrel of FIG. 15 in its retracted position.

FIG. 17 is a partial side elevational view, partly in section and partly schematic, showing still another embodiment of this invention.

FIG. 18 is a partial cross sectional view taken along the lines XVIII—XVIII of FIG. 17.

FIG. 19 is a partial side elevational view, partly in section and partly schematic, of the embodiment of FIG. 17; showing the expansible mandrel fully expanded within a receiving mold emplaced about the belled end.

FIG. 20 is a partial side sectional view, showing the first and second ends of conduit conformingly fitted together with a seal means emplaced within the groove in the belled end.

DESCRIPTION OF PREFERRED EMBODIMENTS

As indicated, this invention includes method and apparatus for forming an elbow from thermoplastic pipe or the like. By elbow is meant a configuration formed by a conduit bent to various angles, as described in my above referenced U.S. Pat. No. 3,753,635. As noted therein, the bend may be at any angle desired; for example, 22½°, 45°, 90°, 120°, etc. In addition, the bends may be smooth and long radius bends, or sharp, short radius bends. The conduit is formed of any thermoplastic material that may be softened by heat, then hardened by cooling. The thermoplastic material is, of course, sufficiently rigid to serve in the application of, or use, as a pipe or conduit. The material may be, for example, polyvinyl chloride; polystyrene; acrylonitrile butadiene styrene copolymer (ABS); or the polyolefinics such as polyethylene, polypropylene; or other homopolymers and copolymers identified as thermoplastic in nature.

In carrying out the process, the conduits, or segments of conduits, are moved to a plurality of locations, or stations; such as, loading location; heating location; heating, belling and bending location; cooling location and unloading location. At the loading location, both ends of each conduit segment are sealingly blocked by at least one expansible mandrel and one cap, as illustrated more clearly in FIG. 4 and described completely hereinafter. Before considering the method completely, it is believed helpful to describe and consider the respective elements and subassemblies for semi-automatically carrying out the steps of the invention.

In the illustrated preferred embodiment of this invention, a system is provided for moving a plurality of conduits, or segments of the conduit, through the various locations, or stations, whereby a plurality of segments of conduit may be operated on at the various locations simultaneously to increase production.

Figure 1:
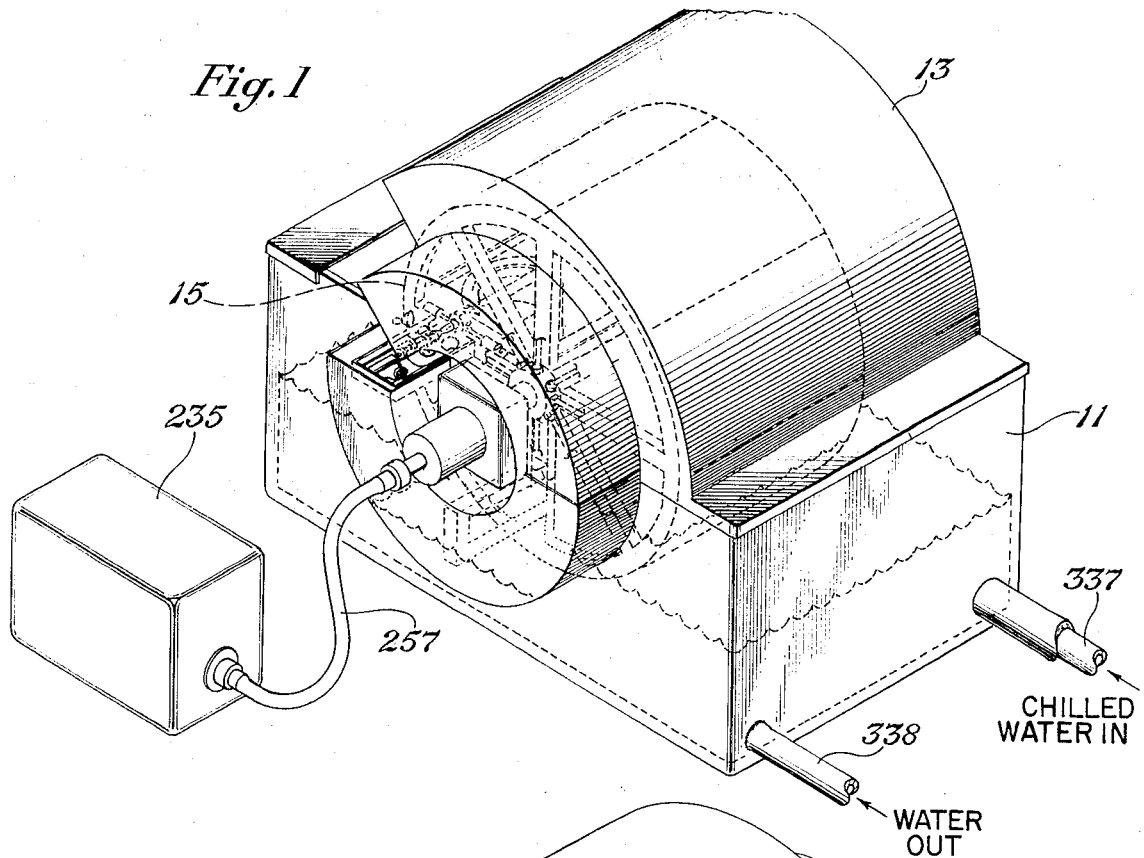
FIG. 1 is a partial side and rear view of the system of one embodiment of the present invention.
Figure 2:
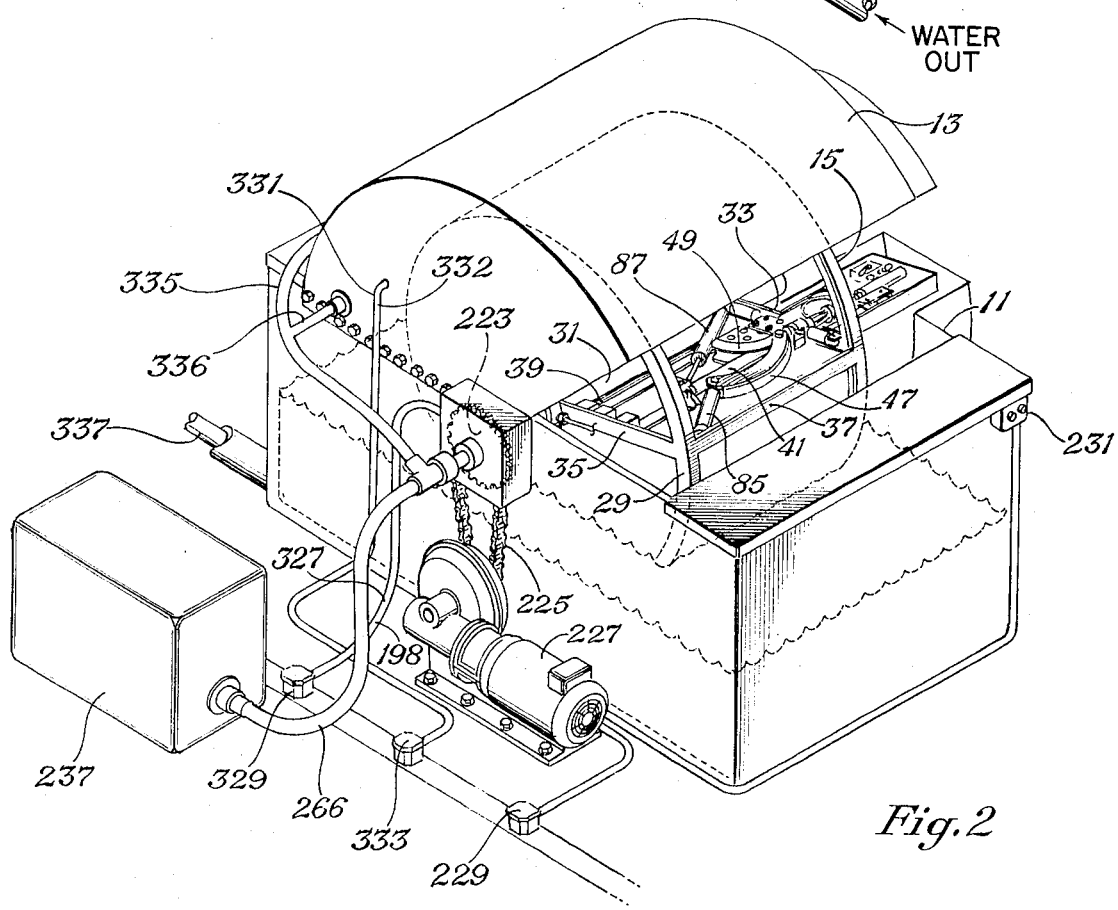
FIG. 2 is a partial side and front view of the system of FIG. 1.
Figure 3:
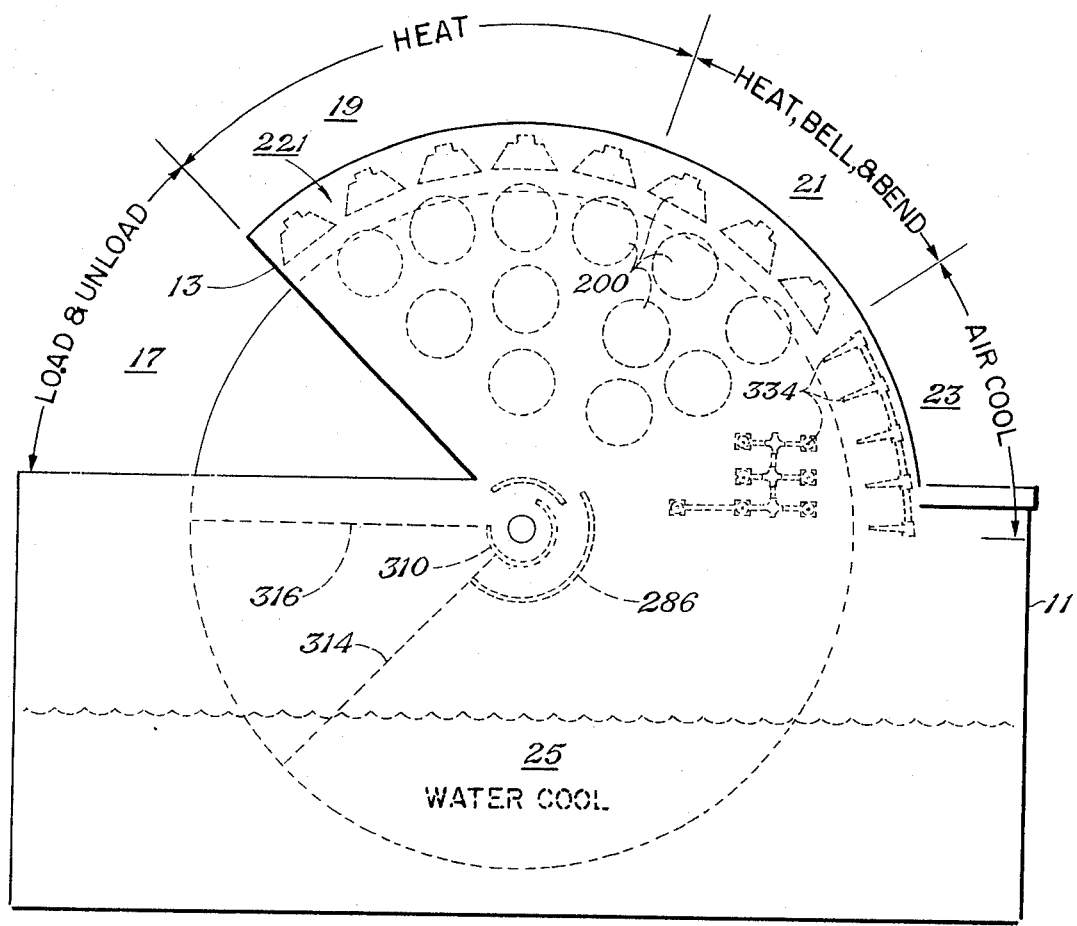
FIG. 3 is a cross sectional side view of the system of FIGS. 1 and 2.

Referring now to FIGS. 1-3, the system, in one embodiment, for bending the plastic pipe, or conduit, to the desired elbow comprises a tank 11 having a hood 13 coupled thereto and supporting a wheel 15 which is rotated about a horizontal axis. The wheel 15 comprises a plurality of sections; for example, 8 sections for holding a plurality of segments of conduit to be subjected to the steps described herein, as they are moved or rotated to a plurality of operating locations, or stations. In the system of FIG. 3, these locations comprise a loading and unloading location 17; a heating location 19; a heating, belling and bending location 21 and a cooling location comprising an air cooling location 23 and a water cooling location 25.

The supporting wheel 15 comprises two rims 27 and 29 (FIGS. 2 and 4) that are coupled to an axle 31 by way of a plurality of spokes, two of which are illustrated at 33 and 35. The rims 27 and 29 also are coupled together by way of a plurality of cross bars, two of which are illustrated at 37 and 39. Each pair of spokes and associated cross bars comprise a section for supporting a conduit, or segment of conduit, 41 as it is moved through the various heating; heating, belling and bending; and cooling locations. One such section is illustrated in FIG. 4.

At each section there are located two clamps 43 and 45 and the jigs 47 and 49 for holding and bending a conduit 41. As seen in FIG. 5, clamp 43 is one of the conventional type having a member 43A which is hinged for movement relative to member 43B for opening and closing the clamp. These members have concave surfaces 43C and 43D which together conform to the outer circumference of the conduit 20. A handle 43E is provided for clamping the members. Clamp 45 is illustrated in FIG. 5A.

As seen in FIGS. 6 and 7, jigs 47 and 49 also have smooth concave surfaces 47A and 49A, respectively, which conform to the outer circumference of the conduit 41. The clamp 43 is fixedly carried by the section and the clamp 45 is movably carried by the section. Also, the interior jig 49 is fixedly carried by the section. The term "interior jig" is employed herein to mean the jig about which the conduit will be bent. The "interior jig" has its receiving surface defining a convex bend, for effecting the inside arc of an elbow. The clamp 43 is secured to the spoke 33 by way of plate 53 and bolts 55. The jig 49 is secured to the spoke 33 by way of support 57, and I-beam 59 and bolts 61. Jig 47 is pivotally coupled to jig 49 by way of support 63 (only one of which is shown in FIG. 4), and pivot member 65 which extends through supports 63 and jig 47. The supports 63 are coupled to the support 57 by way of bolts 67. The jig 47, thus, may be moved away from and toward the jig 49 to define and enclosing mold for the elbow bent to the desired shape.

A piston rod 84 and cylinder 85 are provided for moving the jig 47 while a piston rod 86 and cylinder 87 are provided for moving the clamp 45. The piston rod 84 is pivotally coupled to the jig 47 by way of pivot member 88 while the cylinder 85 is pivotally coupled to the cross bar 37 by way of pivot member 89. The piston rod 86 is pivotally coupled to the lower portion of the clamp 45 by way of pivot member 90 while the cylinder 87 is pivotally coupled to the cross bar 67 by way of pivot member 91.

Also provided is an arcuate guide 94 having a center slot 96 which guides the extending portion of end member 90 as shown more clearly in FIG. 5A. Guide 94 is secured to spoke 35 and lower cross bar 39 by way of members 98 and 100, respectively. Thus, clamp 45 may be moved along an arcuate path to bend the conduit 41 into the desired shape about the jig 49 and within its concave surface 49A. As indicated hereinbefore, the ends of the conduit 41 are sealingly blocked. The ends 71 and 73 of the conduit 41 are normally planar ends that are sawed off as the plastic conduit is extruded. Each of the lengths of conduit will have been cut into short segments of linear conduit that are to be formed into the elbows. As illustrated, one end of the conduit 41 is sealingly blocked by cap 32. The conduit 41 may have its end threaded and the cap 32 threaded onto the end or the cap may be clamped onto the end of the conduit.

At the other end of the conduit 41, there is illustrated apparatus 69 for automatically belling the other rend 71 for conformingly receiving a first end 73, as illustrated in FIG. 20. As illustrated, the end 73 has external dimensions that conformingly mate with the internal dimensions of the belled end 71. The apparatus 11 includes an insert means 74 for inserting an insertable expansible mandrel 75 interiorly of the conduit 41. Expansible mandrel 75 is provided for expanding the end 71 to thereby bell the end to have a predetermined set of internal dimensions for receiving the end 73. An expanding means 77 is provided for expanding the expansible mandrel 75 and the walls of the end 71 at its softening temperature to form a belled end that is adapted for sealingly receiving the co-engaging end of the conduit inserted therewithin.

Figure 8:
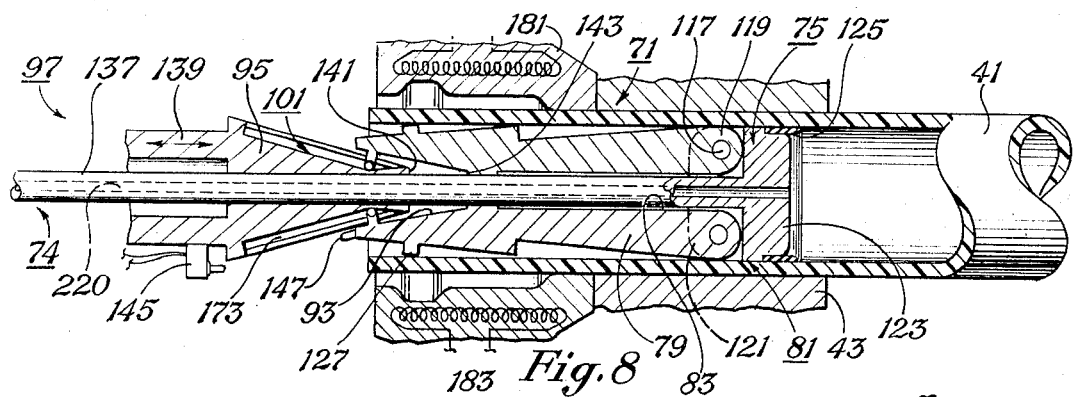
FIG. 8 is a partial side elevational view, partly in section and partly schematic, of the embodiment of FIG. 4; illustrating the expansible belling mandrel inserted in the conduit.
Figures 9, 11:
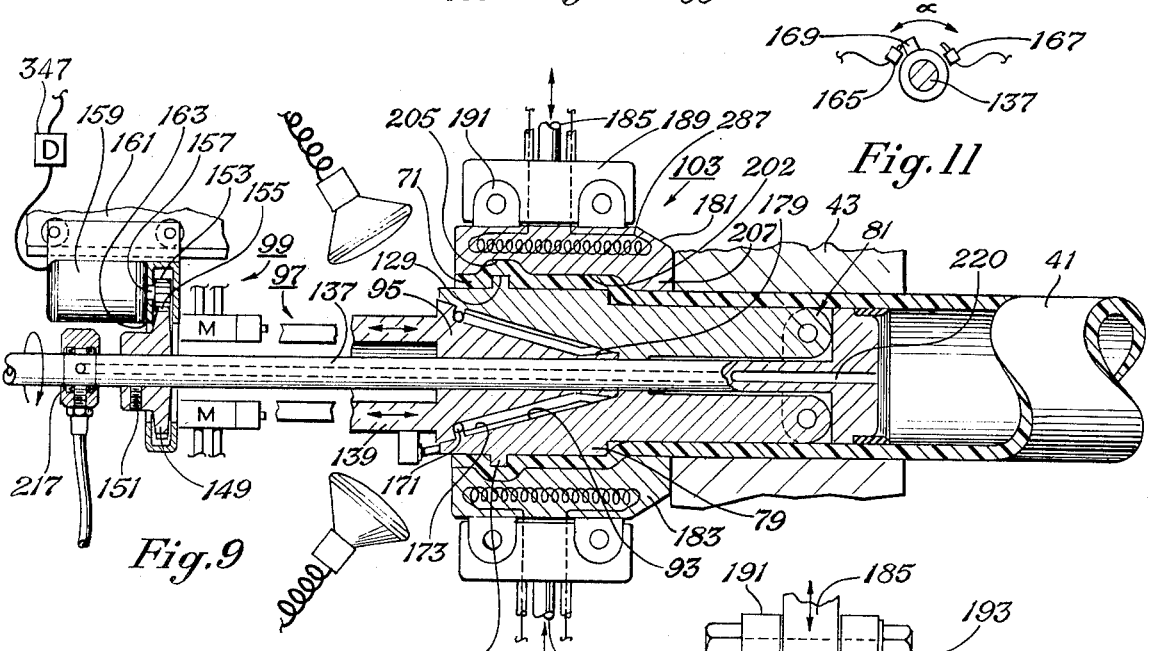
FIG. 9 is a partial side elevational view, partly in section and partly schematic, of the embodiment of FIG. 8; illustrating the expanded mandrel at a later stage of operation.
FIG. 11 is a partial schematic end view showing limit switches for limiting the angle of rotation of the shaft and swage of the embodiment of FIG. 9.

The expansible mandrel 75 comprises a plurality of at least three pieces 79; and a mounting means 81 holding the plurality of pieces 79 assembled and adapted for allowing radially outward expansion of the pieces 79, FIGS. 4, 8 and 9. Expansible mandrel 75 includes a central bore 83 having a first conically shaped bore 93 at the end opposite the mounting means 81. The conically shaped bore 93 is provided for receiving the expanding means 77, such as swage 95. The swage 95 is provided for expanding the plurality of pieces 79 radially outwardly to form the belled ends. As illustrated, the swage 95 is adapted to conformingly fit the first conically shaped bore 93 when fully seated thereinto for forming the belled end 71. Suitable forcing means 97 is provided for forcing the relative movement between the swage 95 and the pieces 79. A smoothing means 99, FIG. 9, is provided for smoothing out the interior surface of the final belled end and removing irregularities caused by normal discontinuities of the expansibly mounted pieces 79. A retraction means 101, FIG. 8, is provided for effecting retraction of the plurality of pieces radially inwardly as the swage 95 is withdrawn from its fully seated position.

Preferably, a bell jig, or mold, 103, FIG. 9, is provided for defining and obtaining the external shape and the proper dimensions of the belled end 71.

The insert means 74 is provided for inserting the expansible mandrel 75 into the end 71 prior to belling of the end and for withdrawing the collapsed mandrel 75 from the belled end. As illustrated, the insert means 74 includes a fluid powered ram 105 adapted to move the piston rod 107, FIG. 4, to effect the desired insertion and retraction. The ram 105 is powered by fluid supplied via conduits 109 and 111 and controlled by multi-way valve 113. Fluid is supplied to the multi-way valve 113 via conduit 115. If hydraulic fluid is employed, a return conduit is supplied to carry the hydraulic fluid back to a hydraulic reservoir. If a compressed gas like air is employed, the multi-way valve 113 may be a three-way valve and the effluent, or low pressure air vented to the atmosphere. The multi-way valve 113 may be solenoid operated. Preferably, it is a manually operable valve, since insertion and retraction is only to be made at the loading station. As illustrated, the expansible mandrel 75 includes four pieces 79. The respective pieces 79 have a predetermined peripheral radius of curvature that is the same as the non-belled end 73 of the conduit 41 so that when expanded outwardly, the interior of the belled end 71 will have an interior shape that conformingly fits with the exterior of the end 73. Each of the pieces 79 is pivotally mounted about a fulcrum shaft 117, FIG. 8. Specifically, each piece 79 has a bifurcated end 119 having an aperture through which the fulcrum shaft 117 penetrates. The fulcrum shaft 117 may comprise a simple bradded shaft, a bolt and nut, or as desired to facilitate assembly. The fulcrum shaft 117 is journalled in a bracket 121 that is an extension of a base 123. The base 123 is adapted to completely fill the interior of the conduit 41 and sealingly engage the side walls for holding a superatmospheric pressure therewithin. If desired, the base 123 may have a sealing skirt 125 of high temperature resilient material. For example, the skirt may be made of polytetrafluoroethylene, fully fluorinated copolymers of hexafluoropropylene and tetrafluoroethylene, or other high temperature materials, such as Delrin or Nylon. The skirt 125 is sealingly connected with the base 123 and sealingly engages the walls of the conduit over a relatively large area without causing extrusion and deformation of the walls of the conduit, even if they reach their softening point. Ordinarily, a skirt will not be necessary. The base 123 may have a sufficient frusto-conical taper to sealingly engage the interior walls of conduit 41. Since the placement of the base 123 within the conduit will be within the "shadow" of the clamp 43, the conduit 41 is maintained below its softening temperature under the clamp 43, as indicated elsewhere herein, so the base 123 will not cause deformation of the conduit.

As can be seen in FIGS. 4 and 8, the respective pieces 79 pivot inwardly to a retracted, or collapsed, configuration for insertion within the conduit 41. The pieces have their pivotal mounting affixed with respect to their interior such that when fully extended, as illustrated in FIG. 9, they form accurately the desired internal dimensions of the belled end 71. Expressed otherwise, the pieces from a cylindrical interior in the belled end 13.

The pieces 79 have an annular ridge 127 disposed peripherally thereof for forming a groove 129, FIG. 9, for receiving a seal means. The annular ridge 127 has a cross-sectional shape that forms a groove that is best suited to sealingly receive the seal means to be employed; and is illustrated as having right angles at its peripherally outermost portion to define a groove for sealingly receiving an O-ring.

Figures 10, 12, 13:
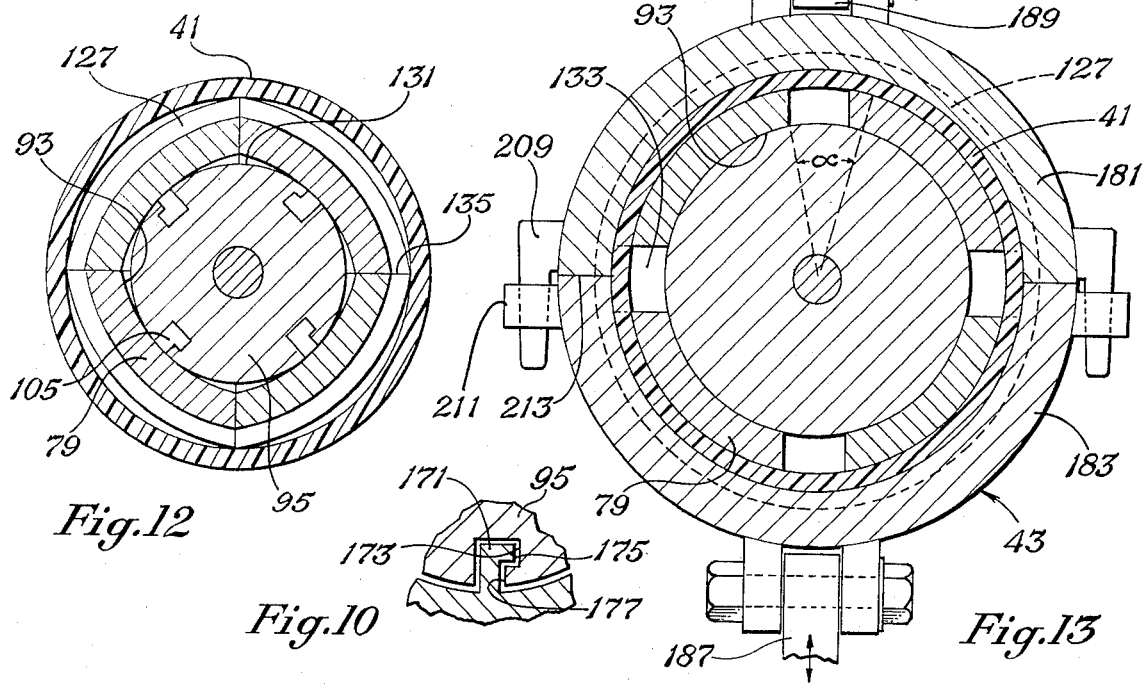
FIG. 10 is a partial cross sectional view taken along the lines X—X of FIG. 9.
FIG. 12 is a partial cross sectional view of the embodiments of FIGS. 8 and 9 with the swage partially inserted within the expansible mandrel.
FIG. 13 is a partial cross sectional view of the embodiments of FIGS. 8 and 9 with the mandrel fully inserted.

The first conically shaped bore 93, FIGS. 8 and 13, is truly frusto-conical in shape when the pieces 79 are in their fully extended position, as illustrated in FIG. 13. When the pieces 79 are retracted, as illustrated in FIG. 12, however, the bore 93 does not conformingly fit the truly frusto-conically shaped exterior 131 of the swage 95. Nevertheless, the pieces 79 are economically formed from cylindrical stock simply by milling off the excess portion to allow the inward retraction of the pieces 79. The blank left by the excess portion is shown as a discontinuity 133, FIG. 13, formed by expansion of the pieces 79 outwardly into their fully expanded position.

As the pieces 79 are initially expanded outwardly, there is a tendency for the respective edge portions 135 to expand the wall of the conduit 41 outwardly at this portion first to help in avoiding inwardly sagging walls at the discontinuities 133. To provide a smooth and continuous interior finish to the belled end 71, however, I have found it advantageous to employ the smoothing means 99 to rotate the mandrel 75 through an an angle α, FIG. 13. The angle α is slightly less than about 30°. For example, I have found it necessary to rotate the expansible mandrel 75 through only about 26° to afford a smooth continuous interior surface on a belled end. If desired, the respective edge portions 135 may be slightly chamfered, or rounded, to facilitate rotation. In addition to, or instead of the chamfering, the swage 95 may be withdrawn slightly to allow slight radial inward movement of the pieces 79 to facilitate rotation through the angle α. After rotation, the swage 95 is again pushed in to expand the expansible mandrel 75 into its fully expanded position. Rotation is effected automatically responsive to closure of sequential limit switches, as described in the operational section hereinafter. If desired, rotation may be effected by operation of an initiation switch by the operator or by passage over a pre-located cam as described hereinafter with respect to switch 298.

The swage 95 is slidable longitudinally of a shaft 137. The shaft 137 is coincident with and may be the same as piston rod 107 of ram 105. The swage 95 is forced inwardly by tubular shaft 139 for expanding the pieces 79. The swage 95 has, at its interior end, a shoulder 141 that seats upon a slight seat 143 to prevent running the swage too far inwardly and over expanding the pieces 79. The tubular shaft 139 also serves to withdraw the swage 95. For example, the swage 95 is withdrawn prior to the rotating of the pieces 79 through the angle α, and is withdrawn substantially completely for moving the pieces 79 into their fully retracted position. The tubular shaft 139 may be powered in its respective directions by any of the conventional means; such as, mechanical or hydraulic means described herein for moving the shaft 137. I have found it advantageous to employ motor means M, FIG. 9, for effecting the respective directions of movement of the tubular shaft 139 and the swage 95. Motor means M comprises fluid-powered rams, including cylinders to which high pressure fluid is directed in response to conventional solenoid operated valves; such as, electro-pneumatic or electro-hydraulic valves. The conventional solenoid valves are operated responsive to limit switch 145 and stop 147. Specifically, the limit switch 145 comprises a two position switch with back side contacts. Such a switch is conventional and need not be described in detail herein. For example, when the swage 95 is fully inserted, the actuator of limit switch 145 is depressed to shut off the valve to stop inward movement of the piston rod of the ram serving as the motor means M pushing the tubular shaft 139 inwardly, as illustrated in FIG. 9. Conversely, withdrawal of the swage 95 will allow extension of the plunger of the limit switch 145, closing back side contacts for effecting, after a suitable delay, rotation of the expansible pieces 79 through the angle α for smoothing the interior of the belled end 71. When the pieces 79 have been rotated through the angle α, the swage 95 is inserted again to expand the pieces 79 at their new position. The limit switch 145 is thereafter again closed. A manual override switch is employed at the unloading station to effect full retraction of the swage 95 to collapse the mandrel 75 prior to its retraction from the belled end 71.

It is believed unnecessary to describe in detail the fluid powered rams employed as the motor means M or the details of the flow of fluid to the respective pistons and cylinder ends of the ram to effect the inward and outward movement of the tubular shaft 139, since such is conventional. It is sufficient to note the means M are firmly anchored against shaft collar 149, FIG. 9, for effecting the relative motion between the swage 95 and the pieces 79. The collar 149 is firmly affixed to the shaft 137, as by set screw 151.

The expansible mandrel 75 may be rotated through the angle α by any suitable means; such as, manual, semiautomatic or automatic. As illustrated, the expansible mandrel 75 is rotated automatically as illustrated in FIG. 9. Therein, the pieces 79 are rotated through the angle α by way of driving gear 153 engaging driven gear 155. The driving gear 153 is mounted on shaft 157 of a motor 159 that is fixed to a slidably mounted support 161. The gears 153 and 155 are retained in engagement by an enclosing housing 163, the slidably mounted support 161 moving with the collar 149. If desired, the gears 153 and 155 may have bevelled sides to effect engagement only at the time when rotation is appropriate in the cycle. As illustrated in FIG. 11, also, the shaft 137 is rotated through the angle α between the respective limit switches 165 and 167 that are suitably closed by protrusion 169. Thus, it can be seen that the exterior surface of the pieces 79 in their fully expanded position will overlap between their respective first and second rotary positions to form a smooth interior of the belled end 71; removing any tendency to form irregularities caused by the normal discontinuities 133 of the expansibly mounted pieces 79.

It is desirable that the pieces 79 be retracted radially inwardly before they are moved longitudinally of the conduit 41 in order to prevent a "smearing effect;" in which the clear, smooth interior surface of the belled end would otherwise be distorted. The illustrated retraction means 101 for effecting this radially inward retraction of the pieces 79 comprises radially extending protrusion 171, FIGS. 8–10, that engages a similarly shaped groove 173 in the swage 95. As illustrated more clearly in the cross sectional view of FIG. 10, the radially inwardly extending protrusion 171 is L-shaped in cross section such that its shoulder 175 engages the second shoulder 177 defining the L-shaped groove 173. Consequently, the protrusion 171 is constrained to move radially inwardly as the swage 95 is withdrawn outwardly. Inward movement of the protrusion 171 pulls free the end of its piece 79 radially inwardly, as illustrated in FIG. 8. Expressed otherwise, a retraction of the swage 95 causes corresponding inward movement of the pieces 79 because of the co-engaging shoulders 175 and 177 of the respective protrusions and grooves 171 and 173. As can be seen in FIG. 9, the protrusions 171 contact the outer end of the respective grooves 173 also to limit inward movement of the swage 95. The grooves 173 have entries 179 in order to allow insertion of the respective protrusions 171 into the grooves 173.

As illustrated more clearly in FIGS. 9 and 13, and as indicated hereinbefore, a bell jig, or molo, 103 is employed for effecting a more nearly perfect belled end 71. The bell jig 103 comprises a pair of tubular half-shells, or shells, 181 and 183 and a means, such as reciprocally movable shafts 185 and 187, for moving the pair of tubular shells 181 and 183 laterally together for receiving an end 71 to be belled and for moving them apart to free the final belled end 71. Respective shafts 185 and 187 are connected with their respective tubular shells 181 and 183 by way of respective members 189 and mounting brackets 191. The members 189 are connected with the respective mounting brackets 191 by simple means, such as nuts and bolts 193, FIG. 13. The respective shafts 185 and 187 are powered by suitable fluid powered rams 195, similarly as described hereinbefore with respect to the piston rod 107 for inserting the expansible mandrel 75. Conduits 197 and 199 are connected with the ram 195 and with the multi-way valve 201. Fluid is supplied to the multi-way valve 201 by way of conduit 203. The valve 201 may be operated electrically, such as a solenoid operated valve, into its respective positions for opening or closing the shells. On the other hand, as indicated hereinbefore, the valve 201 may be a manually operable valve such that the operator can open the shells 181 and 183 at the loading and unloading station and close them around a new segment of conduit inserted therewithin. The tubular shells 181 and 183 conformably fit together to define a part of the jig means and define an internal cavity 202 of the desired shape and dimensions. As illustrated, the shells 181 and 183 have an internal annular groove 205 defining the outer dimensions of the belled end 71. Preferably, the tubular shells 181 and 183 also have an interiorly extending portion 207 defining the shape of the joinder of the belled end 71 with the remainder of the conduit 41, as illustrated in FIG. 9. The portion 207 terminates adjacent the clamp 43. The annular groove 205 affords a recess into which the plastic walls of the end 71 of the conduit 41 can be expanded outwardly by the ridge 127 of the expansible mandrel 75. Male guides 209 at the respective points on the tubular shell 181 co-engage receptacles 211 to effect proper alignment. If desired, the respective edges 213 may be of tongue and groove construction or the like also to ensure a proper fit. This has not proven to be necessary when the respective guides and receptacles are employed. It is apparent that the tubular shells need only be moved apart a sufficient distance to allow the ridge formed around the interior groove 129 to be withdrawn longitudinally. I have found it advantageous, however, to move the tubular shells 181 and 183 far enough apart to insert the conduit 41 and to remove the belled end 71 laterally and obviate the difficulties of having to make an insertion of the conduit longitudinally therethrough.

At the loading location, jig 47 and clamp 45 are in the positions illustrated in FIG. 4. Loading is carried out by opening the clamps 45 and 47 and the tubular shells 181 and 183 and inserting the conduit 41 between the open jig means; including the jigs 47 and 49 and the bell jig formed by the tubular shells 181 and 183. The clamps are then closed. The shells 181 and 183 are closed about the end 71 to be belled. If only one end of the conduit 41 is to be belled, the cap 32 is emplaced on the movable end, similarly as described in U.S. Pat. No. 3,753,635. The expansible mandrel 75 is inserted within the other end of the conduit 41 as described hereinbefore. Specifically, the valve 113 is turned to cause extension of the piston rod 117 and insertion of the expansible mandrel via shaft 137 into the end of the conduit 41. The skirt 125 provides a fluid tight seal with the interior wall of the conduit 41.

A conduit 215 is connected with the shaft 137 by way of universal coupling 217 and thence via internal passageway 220 with the interior of the conduit 41, FIG. 9. This allows fluid to be supplied to the interior of the conduit at superatmospheric pressure for use in accordance with this preferred embodiment of the invention. In this preferred embodiment the increased pressure is supplied to the interior of a conduit 41 by applying a gas under pressure to the conduit 41 by way of conduit 215. The pressure is relatively low but high enough to prevent the walls from becoming distorted as the conduit is heated, belled, bent and cooled. Differential pressure is proportioned to such factors as wall thickness, degree of softness of the wall and completeness of the jig, or mold surrounding the softened conduit. For example, only a few ounces per square inch may be adequate with thin walled conduit and only an interior jig, whereas several to as many as 100 or more pounds per square inch gauge (psig) may be advisable with a completely enclosing mold or with thick walled conduit in order to prevent adverse buckling of the interior wall. The pressure may be controlled by any suitable means, as by a regulator 219 on the line directly or on a main source to which the conduit 215 is connected. Having established the increased pressure on the interior of the conduit 41, it is moved to the heating location where it is heated to its softening temperature by a heater illustrated at 221, FIG. 3. As illustrated, the wheel 15 is rotated through the various locations for carrying out the respective operations.

As shown in FIG. 2, a drive system comprising a sprocket wheel 223 secured to the axle 31; a driving member, such as chain 225; and a motor and gear system 227 driven by a power source 229 is provided for rotating the wheel 15. The axle 31 is supported by bearing means secured to the wall of the tank 11. A start-stop control 231 is provided for controlling the rotation of the wheel 15. For example, at the loading and unloading location, the control 231 may be actuated to stop rotation of the wheel 15 such that a conduit 41 may be loaded in the clamps and jig arrangement. After it is loaded, then the control 231 may be actuated to start rotation of wheel 15. In FIG. 2, rotation is in the counter-clockwise direction, as viewed from the left end.

When a conduit 41 is being loaded, valve control 219A, FIG. 4, is closed to stop the flow of air through the conduit 215. After the expansible mandrel 75 and the cap 32 have been placed on the ends of the conduit 41, the valve control 219A may be opened to pressurize the interior of the conduit.

A universal coupling means rotatably connected to sources of air pressure is provided for applying air continuously to each conduit 41 and to each of the operable rams; such as, rams 85, 87, 105, 195 and M; during each cycle of the wheel 15. The term "universal coupling means" is employed herein in the sense of a rotating joint that allows sealing interconnection between the respective elements regardless of the angle through which the apparatus is rotated. The universal coupling is referred to herein as rotating joint also. In FIG. 4, it maintains the source of air pressure connected to each conduit 41 throughout rotation of the wheel 15 and as desired to each of the rams. The rotating joints are illustrated in and the elements thereof are specifically described with respect to FIGS. 4 and 22 hereinafter. In addition, a switching system is employed to control the flow of air through each conduit 41 and the application of air to the respective cylinders of the rams; for example, to cylinders 85 and 87; during each cycle of the wheel 15 to carry out the desired belling and bending operation.

Referring to FIGS. 1 and 2, a low pressure source, or compressor, 235 is provided for applying low pressure air to the interior of the conduit 41. A higher pressure source, or compressor, 237 is provided for applying high pressure air to the respective cylinders. Air is applied from the compressor 235 to the conduits 41; and from the compressor 237 to the cylinders, such as cylinders 85 and 87, by way of rotating joints, or universal couplings, formed in opposite ends of the axle 31. These rotating joints are illustrated more clearly in FIG. 22. As seen therein, the axle 31 extends through the side walls of the tank 11 and is supported for rotation by bearings 244 and 245 which are supported by the members 246 and 247, respectively. These members are secured to the side wall structure of the tank 11. Stationary cores 248 and 249 extend partially into opposite ends of the axle 31. Core 248 has an axial aperture 250 formed therein which connects with a plurality of radial apertures 251 which in turn extend to a circumferential slot 252. Extending through the axle 31 are a plurality of apertures 253 forming passageway from the slot 252 to an annulus 254 formed by the annular member 255 that is secured to the exterior of the axle 31 for rotation therewith. The conduit 215 as well as the corresponding conduits for the other sections are coupled to the member 255 in communication with the annulus 254. Air conduit 257, see FIG. 1 also, extends from air compressor 235 to the axial aperture 250 formed in the core 248. Thus, as the axle 31; and, hence, the wheel 15; rotates, air is supplied to the plastic conduits 41 by way of conduit 257, axial aperture 250, radial apertures 251, circumferential slot 252, apertures 253, annulus 254 and conduits 215. O-rings 256 prevent leakage of air between the core 248 and the axle 31.

The rotating joint formed in the other end of the axle 31 is similar and comprises stationary core 249 having an axial aperture 260 which connects with a plurality of radial apertures 261 that in turn extend to a circumferential slot 262. Extending through the axle 31 are a plurality of apertures 263 that form a passageway between the slot 262 and the annulus 264 formed by the annular member 265. This member is secured to the axle 31 for rotation therewith. Conduit 266, see FIG. 2 also, extends from air compressor 111 to the axial aperture 160 while conduits 267 are coupled to the member 265 in communication with the annulus 264. Thus, air is supplied from the air compressor 111 to the conduits 267 by way of conduit 266, axial aperture 260, radial apertures 261, circumferential slot 262, apertures 263 and annulus 264. O-rings 268 prevent leakage of air between the axle 31 and the core 249. Conduits 267 are in communication with the cylinders 85 and 87 of each of the sections of the wheel 15, as well as with the other cylinders, as will be described subsequently.

A retaining ring 270 prevents the core 248 from sliding axially with respect to the axle 31. This ring is supported in a circumferential slot formed in the core 248 in between the end of the axle 31 and an end cap 271 fitted to the end of the axle 31. The core 248 is prevented from rotating by a bolt 272 threaded into the core and extending through a support member 273 secured to the wall structure of the tank 11.

Similarly, retaining ring 274 prevents the core 249 from sliding axially with respect to the axle 31. This ring is supported in a circumferential slot formed in the core 249 and between the end of the axle 31 and an end cap 275 threaded to the end of the axle 31. The core 249 is prevented from rotating by a bolt 276 threaded into the core and extending through a support member 277 secured to the other side wall structure of the tank 11. The sprocket wheel 223 is secured to the axle 31 by suitable means, such as a conventional key and lock slot (not shown).

During each cycle of operation, air is fed to conduits 215 continuously through the rotating joint formed through core 248 and the annulus 254. During loading and unloading, valve controls 219A are closed to stop the flow of gas to the conduits 41 to be loaded or unloaded. After loading, the valve controls 219A are opened and during the cooling cycle air is continuously applied to the conduits 41 by way of open conduits 215.

At each section, a flexible conduit 280, FIG. 4, extends from the end cap 32 and leads to a solenoid controlled or actuated valve 281 having a vent 281A. The valve is closed when a conduit 41 passes through the heating location 19 and the heating, belling and bending location 21. Thus, air is prevented from flowing through the conduit 41 when it passes through these locations. The valve 281, however, is opened when the conduit 41 passes through the air cooling location 23 and through the water cooling location 25. Thus, as the conduit 41 passes through these locations, air will flow through the conduit 41 for cooling purposes. The inside diameter of the conduit 280 and the opening through valve 281, however, are small and the pressure drop within the conduit 41 will not be significant as it passes through locations 23 and 25. Thus, through these locations the air pressure within conduit 41 will be sufficient to minimize distortion of the walls of the conduit 41.

Electrical energy is supplied to each solenoid actuated valve 281 by way of electrical leads 282 and 283 and switch 284. The switch 284 is a spring biased switch and normally is in the open position illustrated in FIG. 4. Thus, in this position electrical energy is not applied to the valve 281. This valve is a spring biased valve that is normally biased to the closed position when not actuated. When switch 284 is closed, however, electrical current is applied to the valve 281 to open the valve to the flow of gas through the valve by way of conduit 280 and vent 281A. A circular shaped member, or cam, 286, also FIG. 3, is secured to the side wall structure of the hood 13 and of the tank 11 for closing the switch 284 as each segment passes through the cooling locations 23 and 25. Thus, as a section passes through these two locations, the valve 284 will be closed by the cam 286 to open the valve 281. As the section moves through other locations, the switch 284 will be open whereby valve 281 will be closed. Each section of the wheel 15 has a similar solenoid controlled valve 281 and switch arrangement 284 which is controlled by the cam 286 as each section passes through the locations 23 and 25.

Instead of a solenoid controlled valve 281, there may be employed a normally closed spring biased valve having a protruding control member which is actuated directly by the cam 286 to open the valve as each section passes through the locations 23 and 25.

Referring to FIG. 3, heat is applied to locations 19 and 21 by heating elements comprising a plurality of heat lamps 200. If desired, a heating element 287, FIG. 9, may be employed in the jig mold for heating the end to be belled. Such a heating element 287 compensates for the shadow of the jig mold that tends to prevent adequate radiant heating of the conduit 41 at the end to be belled. Moreover, as illustrated in FIG. 4, heat lamps 200 may be disposed at the end to increase the heating of the end to be belled. As can be appreciated, the clamp 43, similarly as with clamp 45, also provides a shadow and tends to retain this portion of the conduit 41 at slightly above its softening point while the remainder of the conduit is heated to its softening temperature.

The plurality of heating lamps are secured to the top and side wall of the hood 13 by conventional means. The hood 13 is suitably insulated, as with fiberglass. Electrical energy is supplied to these lamps by way of conductors 331 and 332 which extend to an electrical power supply 333, as illustrated in FIG. 2.

Cooling air is supplied to the location 23 by way of a plurality of nozzles illustrated at 334 in FIG. 3. These nozzles are coupled to the compressor 237 by way of conduits 335 and 336, FIG. 2. Chilled water may be circulated through the lower portion of the tank 11 for cooling purposes by way of inlet and outlet illustrated at 337 and 338, FIGS. 1 and 2.

From the operational description it will become apparent that the closure of switch 298 effects simultaneous belling and bending of the elbow, or conduit 41. To facilitate understanding, the belling and bending operations will be described separately. It is to be remembered, however, that there is control and response interaction that achieves advantageous results.

Figure 21:
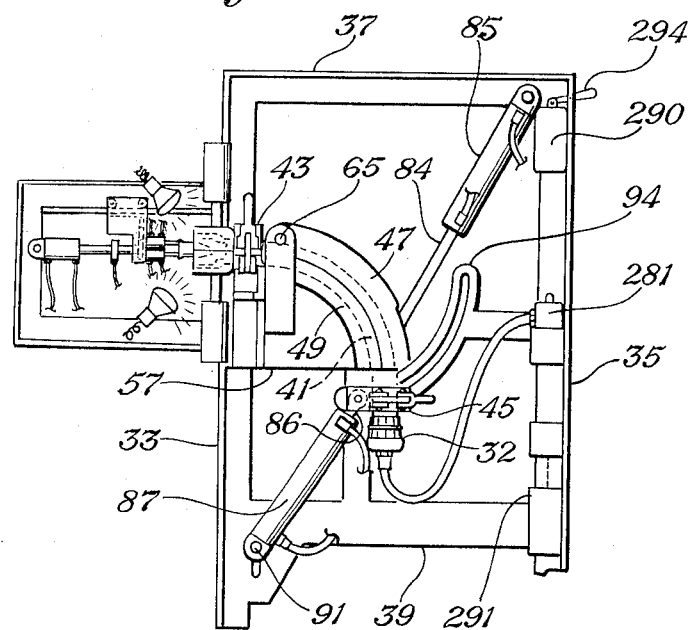
FIG. 21 is a partial view of the section of FIG. 4 showing the bending jigs closed about a bent plastic conduit.

With respect to the bending operation, the jig 47 and clamp 45 are operated in the following manner during each cycle of the wheel 15. At the load and unload location 17, the jig 47 is in the open position shown in FIG. 4. In addition, clamp 45 is in the position shown in FIG. 4. After loading, the jig 47 and the clamp 45 remain in these positions as each section passes through the heating location 19. As the section passes through the heating, belling and bending location 21, however, the clamp 45 is pulled toward the cylinder 87 by the piston rod 86 to bend the conduit 41 within and around the jig 49 to the desired elbow configuration. The jig 47 follows the bending movement of the clamp 45 to aid in the final forming operation. An adjustable stop 94A is secured to the guide 94 in accordance with a degree of bend to be effected and limits the position to which the clamp 45 may be moved. The jig 47 terminates its bending movement when its lower edge abuts against the top edge of the jig 49, as illustrated in FIG. 21. The fully closed position of the jig 47 is reached prior to the passage of each section from the heating, belling and bending location 21. The wheel 15 is driven slowly during its cycle whereby it may take 5 to 30 minutes or more for each section to pass through heating location 19 and a similar amount of time for the section to pass through each of the locations 21, 23 and 25. Longer times are required for larger diameter conduit with thicker walls. It is frequently advantageous to preheat the segments of conduit to just below their softening temperature immediately before loading to reduce the cycle time. Such preheating is readily carried out with conventional equipment; for example, heated rollers and/or heat lamps in an insulated cabinet. The operator wears conventional heat protective equipment, such as asbestos gloves, for safety in handling such preheated segments of conduit. If desired, the operator may temporarily stop rotation of the wheel for a desired time period as each section enters the heating location 19 to ensure proper heating and softening of the conduit. This may be done automatically rather than manually if desired. The jig 47 remains in its closed position as the section passes through the cooling locations 23 and 25.

As the section exits from the cooling location 25 and approaches the loading and unloading location 17, the operator may temporarily stop movement of the wheel 15 by actuation of the startstop control 231. The operator may then manually control the application of air to the cylinder 85 to move the jig 47 to its open position. After the jig 47 has been moved moved to its full open position, the bent conduit 41 in the form of a precisely formed elbow is unloaded. The cylinder 87 then is controlled to move the clamp 45 back to the position shown in FIG. 4 such that a new conduit 41 may be loaded into the section for bending.

The system for controlling the flow of air to each pair of cylinders 85 and 87 comprises a pair of valves 290 and 291, respectively. Valve 290 is a manually controlled valve while valve 291 is controlled by spring biased solenoid 292. Valves 290 and 291 have movable members 290' and 291'. Each of these members have four passageways 290A–290D and 291A–291D, respectively extending therethrough. Member 290' may be moved by handle 294 to position either passageways 290A and 290B or 290C and 290D for fluid flow through the valve. The member 291' is moved by solenoid 292. The solenoid 292 has electrical energy applied thereto by way of electrical leads 296 and 297 and switch 298. Switch 298 is spring biased to the open position whereby solenoid 292 is in a nonactuated condition. In this condition, solenoid 292 maintains member 291' normally in the open position shown whereby air flows through the valve 291 by way of passageways 291A and 291B. When switch 298 is closed, solenoid 292 is actuated to move the valve member 291' to an opposite position whereby air flows through valve 291 by way of passageways 291C and 291D.

Coupled to the valve 291 is the conduit 267, vent 300 and conduits 301 and 302. Conduit 301 is coupled to the conduits 303 and 304 which extend to the cylinder 87 and valve 290. Conduit 302 is coupled to conduits 305 and 306 which also extend to cylinder 87 and valve 290. Conduits 303 and 305 are coupled to cylinder 87 on opposite sides of a piston that is located therein and connected to piston rod 86. Conduits 308 and 309 extend from valve 290 to cylinder 85 on opposite sides of the piston therein that is coupled to the piston rod 84.

When the valves 291 and 290 are in the position shown, air from the conduit 267 flows by way of passageway 291A and moves the piston rods 86 and 84 into the position shown in FIG. 4. In this respect, air flows to the cylinder 87 by way of conduits 301 and 303 and to cylinder 85 by way of conduits 301 and 304, passage 290A and conduit 308. The other sides of the pistons are vented through passageway 291B and vent 300 by way of conduits 305 and 302 and by way of conduit 309, passageway 290B and conduits 306 and 302.

As indicated previously, the piston rods 84 and 86 and, hence, jig 47 and clamp 45 are in the position shown in FIG. 4 after loading at location 17 and at the heating location 19. As the section enters the heating, belling and bending location 21, piston rod 86 begins to move to pull the clamp 45 and, hence the conduit 41 toward the jig 49 to carry out the desired bending operation. A short time later, piston rod 84 begins to move the jig 47 to its closed position to aid in the bending and forming operation. Movement of the piston rods 84 and 86 to carry out bending and forming is initiated by closing switch 298 when the section moves into the heating, belling and bending location 21. This actuates solenoid 292 to move member 291' to allow fluid flow through valve 291 by way of passageways 291C and 291D. A circular shaped member, or cam, 310 is secured to the side wall of the hood 13 and the side wall of the tank 11 to close the switch 298, when the section enters the heating, belling and bending location. As seen in FIG. 3, member 310 also extends through the cooling locations 23 and 25 and around to the horizontal level of the axle 31. Thus, switch 298 is closed and remains closed as a section passes through the heating, belling and bending location 21 and through the cooling locations 23 and 25. Thus, the piston rods 84 and 86 are moved to their bending and forming positions at location 21 and are maintained in these positions through the locations 23 and 25. It will be understood that each section of the wheel 52 will have a similar system as shown in FIG. 4, whereby the cam 310 will control each switch 298 in a similar manner.

As indicated previously, piston rod 84 starts moving to its forming position after piston rod 86 begins initial movement. Piston rod 84 then follows movement of the conduit 41, whereby jig 47 is moved to its forming and closed position. Delayed movement of the piston rod 84 is accomplished by the provision of a small bleed 312 coupled to the valve 290 and the conduit 309. With this arrangement, less volume of fluid is supplied to the piston of the piston rod 84 whereby it will move, when it moves jig 47 to its forming and closed position, at a slower rate than piston rod 86 effecting the bending.

When each section leaves the location 25; for example, at the position shown by the dotted form at 314 in FIG. 3, rotation of the wheel 15 may be stopped by the operator. The operator may then unload the bent conduit by moving handle 294 of valve 290 to move passageways 290C and 290D of valve 290 between conduits 304 and 308 in between conduits 306 and 309, respectively. In this position, the piston rod 84 will be moved in an opposite direction to move the jig 47 to its open position, whereby clamps 43 and 45 may be opened and the expansible mandrel 75 collapsed and it and the cap 32 removed to unload the precisely formed elbow. After unloading, handle 294 may be moved to position passageways 290A and 290B for fluid flow through the valves 290, whereby the jig 47 may be moved back to its closed position. Rotation of the wheel 15 is again started by the operator. When the section moves beyond the curved switch control cam 180 to the position; for example, beyond that illustrated in dotted form 316 in FIG. 3, switch 298 will open. Rotation of the wheel 15 again may be stopped by the operator and the piston rods 84 and 86 allowed to move back to the position shown in FIG. 4 whereby a new conduit 41 may be loaded and the cycle repeated. Instead of the valve 291 being controlled by solenoid 292, he valve 291 employed may be spring biased and have a protruding control member which is actuated directly by cam 310 to control movement of member 291, if desired.

Figure 22:
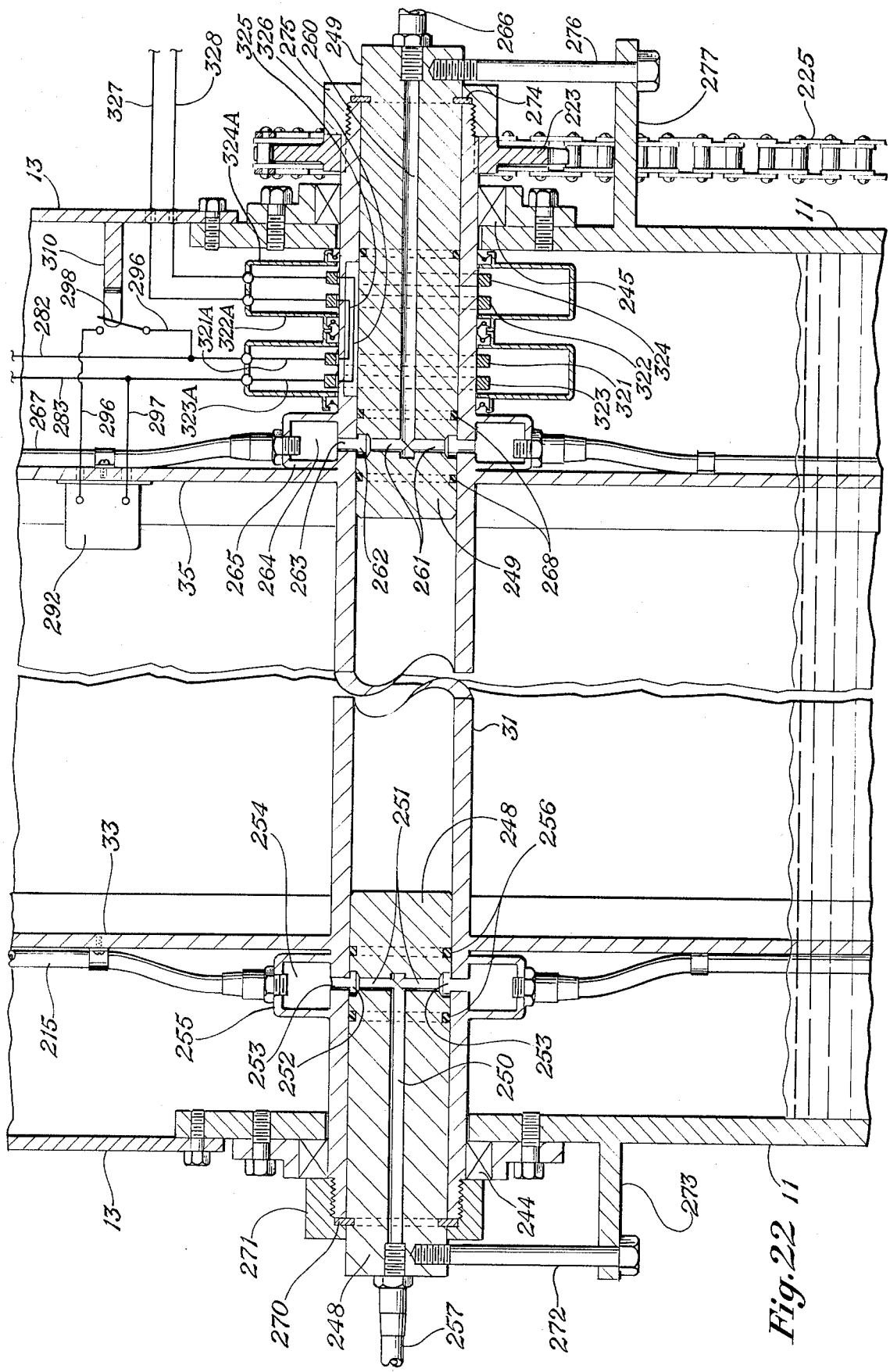
FIG. 22 is an enlarged cross sectional view of the axle of the system of FIGS. 1, 2 and 4.

As illustrated in FIG. 22, two pairs of slip rings 321, 322 and 323, 324 and associated brushes 321A–324A are employed to apply electrical energy to the electrical leads 282, 283 and 296, 297. Leads 283 and 297 both are coupled with brush 323A while leads 282 and 296 are coupled to brush 321A. Slip ring 321 is coupled to slip ring 322 by way of conductor 325 while slip ring 323 is coupled to slip ring 324 by way of conductor 326. Extending from slip rings 322 and 324 are brushes 322A and 324A. Coupled to these brushes are electrical leads 327 and 328 which extend to an electrical power supply 329, as illustrated in FIG. 2.

In operation of the expansible mandrel for simultaneously belling the end 71, the inserting means inserts the expansible mandrel into the end of the conduit 41 at the loading and unloading location 17. This is effected by moving the valve 113 to the extend position to effect extension of the piston rod 107 and move the expansible mandrel into the end 71 of the conduit 41. If a skirt is employed, two 180° halves may be employed to facilitate insertion of the skirt within the end of the conduit and in sealing engagement with the end of the conduit. At the loading and unloading location also, the valve 201 is moved to effect movement of the shells 183 and 181 together about the end 71 of the conduit 41. Thereafter, the conduit 41 with the expansible mandrel 75 inserted therewithin, is rotated into the heating location 19. The end 71 of the conduit is heated and softened. As the section with the conduit passes from the heating location 19 into the heating, belling and bending location 21, and as described hereinbefore with respect to movement of valve 291 to supply power to cylinders 85 and 87, cam 310 closes switch 298. Consequently, high pressure fluid is supplied via valve 290 to rams M. The rams M then drive the swage 95 inwardly, expanding the pieces 79 outwardly into their fully expanded position, similarly as illustrated in FIG. 9. With the first expansion, there are points of discontinuities 133, FIG. 13, that will have rough interior finishes if not snoothed. Consequently, the closure of the switch 145, effected by the fully inserted position of the swage 95, effects retraction of the swage 95, at least slightly; drawing respective pieces 79 inwardly at least slightly. As illustrated, closure of the switch 145 operates the solenoid 343 of solenoid valve 345 that effects retraction of the swage 95. As the swage begins retraction, the back sides of contact switch 145 close energizing delay 347. After a suitable elapsed time to allow sufficient retraction of the respective pieces 79; for example, 1 to 5 seconds or more, the motor 159 is then energized to rotate the expansible mandrel and the pieces 79 through the angle α. As the shaft 137 is rotated, rotating the expansible mandrel, the protrusion 169, FIG. 11, closes the limit switch 167. Closure of the limit switch 167 effects movement of the solenoid 343 and valve 345 into the other position to reverse the direction of movement of the swage 95. The swage 95 is again driven inwardly to fully seat and expand the pieces 79 into their fully expanded position. The second closure of switch 145 does not effect movement of solenoid valve 345, since its signal is blocked by gate G, FIG. 4. Specifically, gate G may comprise a NAND gate that is rendered nonconductive by logic counter C following the first closure. Following the second closure the logic counter C again renders the gate G conductive for belling the next conduit 41. The final finish of belled end 71 is smooth with a continuous groove 129 formed therein. The delay 347 may comprise any suitable delay such as a bistable multivibrator or a conventional timer and switch. Likewise, the counter C and gate G are conventional.

If separate heating element 287 is employed in the bell jig, it is preferred that it be turned off by entry into the heating, belling and bending location 21 such that the belled end will begin to be cooled by the shadow of the jig means and more readily retain the shape of its belled end.

The base 123 maintains sufficient sealing contact with the interior walls of the conduit 41 even during rotation to maintain the superatmospheric pressure within the conduit 41, since the conduit is being bent simultaneously.

As indicated hereinbefore, the cam 310 effects opening of the valve 291 and withdrawal of the swage 95 when the section reaches the dashed line 316 immediately upstream of the unload location 17. The operator may then position the valve 201 to open the shells 181 and 183 and position valve 113 to effect retraction of the collapsed expansible mandrel from the conduit 41.

As the swage 95 is withdrawn from the first conically shaped bore, FIG. 9, the shoulder 177, FIG. 10, of the groove 173 effects retraction radially inwardly of the free end of the pieces 79, collapsing the expansible mandrel 25. Collapsed mandrel 25 is withdrawn from the belled end 71. The belled end will have been cooled, of course, below its softening temperature and will retain its belled shape.

Another segment of conduit is loaded into the sections of the wheel as described hereinbefore and the cycle repeated.

Other Embodiments: As noted in the above referenced application Ser. No. 349,293, other embodiments of this invention have advantages; for example, having the pieces expansible radially outwardly by way of a parallelogram linkage to avoid the pivotal movement; and tot have respective expansible plugging sectors that, upon expansion, fill the discontinuities to provide a smooth interior finish to the belled end 71 without requiring rotation through the angle α as described hereinbefore. In such other embodiments, primarily the form of the expansible mandrel is altered. Accordingly, it is unnecessary to repeat the descriptive matter with respect to the wheel 15 and the respective sections therewithin. It is noteworthy, however, that the base 123 sealingly engages conduit 41 such that air supplied via passageway 220 maintains the requisite superatmospheric pressure for the simultaneous precision bending.

One such embodiment is illustrated in FIGS. 14–16. Therein, the pieces 79 are expansible radially outwardly by the swage 95 moving relatively inwardly thereof in the outwardly expanding, or conically shaped, bore 93. In order to effect the same relative orientation of the respective pieces 79 parallel to the shaft 137, however, a parallelogram linkage 347 is employed for mounting of the pices 79. As is known with parallelogram linkages, a plurality of respective links 348 and 349 are pivotally connected with the shaft 137 and with the respective pieces 79 by way of fulcrum shafts 350. Suitable fulcrum shafts have been described hereinbefore with respect to the fulcrum shafts 117 of FIG. 8. Respective links and fulcrum shafts for the diametrically opposed pieces 79 may be connected at the same longitudinal location but will be offset slightly for the opposite set to prevent problems having sufficient room. Also in the embodiment of FIGS. 14–16, a plurality of respective plugging sectors 351, FIGS. 15 and 16, are provided for moving into the normal discontinuity 133, FIG. 13, for plugging respective gaps between the plurality of pieces 79 when the pieces are expanded radially outwardly into their fully expanded position, as illustrated in FIG. 15. As illustrated in FIG. 16, the respective plugging sectors 351 are retractable into recesses 353 before the pieces 79 are retracted radially inwardly to their retracted position. An expansion and retraction means 355 is provided for expanding and retracting the respective plugging sectors 351. The use of the respective plugging sectors 351 eliminates the necessity of having to rotate the expansible mandrel 75 through the angle $\alpha$ to form a smooth interior finish to the final belled end 71. Accordingly, only the means M for driving in and retracting the swage 95 is required; and the respective interaction between the solenoid 343, valve 345 and the motor 159 to effect rotation through the angle $\alpha$ is not required.

As can be seen in FIG. 15, each respective plugging sector 351 has lateral extensions 357 on each side. The lateral extensions 357 serve as guides and also as limits to prevent outward expansion of the respective plugging sectors 351 sufficiently to effect a rough finish on the interior of the belled end 71. Expressed otherwise, the respective lateral extensions 357 have a degree of angularity that conformingly fits with the passageways 359 of the respective recesses 353 to guide the plugging sectors 351 outwardly and stop the radial outward expansion at the proper radial distance for effecting a satisfactorily smooth finish on the interior surface of the belled end 71.

The expansion and retraction means 355 comprises an expansible bag 361 connected with the plugging sectors 351 by way of shafts 363. The expansible bag 361 is connected with a conventional source of high pressure fluid by way of suitable conventional solenoid operated valves. The expansible bag 361 is formed of corrugated or pleated flexible material, such as one of the aforementioned plastics, that is designed to withstand the high temperature; yet expand under the high fluid pressure and retract when the fluid is withdrawn, or sucked out. The respective valves are operably connected with the limit switch 365, FIG. 14. The limit switch 365 has front and back side contacts such that inflation of the expansible bag 361 is effected when the limit switch 365 has its plunger 367 depressed by inward movement of the swage 95; and deflation and retraction of the bag 361 is effected by opening of the limit switch 365 when its plunger 367 is released. Expressed otherwise, the plugging sectors 351 are moved outwardly only after the respective pieces 79 have been expanded most of their radial outward expansion; and the plugging sectors 351 are retracted before the respective pieces 79 are retracted any significant degree physical stops prevent over-expansion.

The operation of the embodiment of FIGS. 14-16 is substantially the same as described hereinbefore with respect to the embodiment of FIGS. 4-13. The fluid passageway 220 provides flow path for the interior fluid pressure for the precise bending in this embodiment too. The base 123 seals against flow interiorly of the pieces 79 for holding the superatmospheric pressure in the conduit 41, similarly as illustrated in FIGS. 17 and 19. The parallelogram linkage 347 does not alter the operation to any significant extent. The use of the expansion and retraction means 355 and the plugging sectors 351 eliminates the necessity for the step of rotating expansible mandrel 75, as indicated hereinbefore. The expansible mandrel 75 has its pieces 79 retracted radially inwardly before the collapsed mandrel 75 is withdrawn from the belled end 71 of the conduit 41. As indicated hereinbefore, the belled end 71 is preferably belled into a bell jig, such as outer shells 181 and 183, FIG. 9.

Still another embodiment of this invention is illustrated in FIGS. 17-19. In the embodiment of FIGS. 17-19, the expansible mandrel 75 comprises a plurality of pieces 79, and the swage 95 and operates in principle similarly as described hereinbefore. In the embodiment of FIGS. 17-19, however, the respective pieces 79 have riders 371 that are movable longitudinally of the tracks 373 that extend radially of the base 123. As illustrated in FIG. 18, the tracks 371 have a cross sectional shape that resembles an inverted T to extend into the T-shaped groove defining the track 373. Consequently, the rider 371 is able to slide longitudinally of the track. The rider 371 has appreciable length to prevent binding as respective pieces 79 are forced radially outwardly by the inwardly moving swage 95.

Also in the embodiment of FIGS. 17-19, the shaft 137 is rotatable with respect to the pieces 79 and the swage 95. The swage 95 is threadedly mounted on the shaft 137 so as to be moved radially inwardly and outwardly with respect to the pieces 79, depending upon the direction of rotation of the shaft 137. The shaft 137 is sealingly journalled in the base 123 by way of suitable bearing means 379 and seal 375. Rotation of the respective pieces 79 and the swage 95 is prevented by way of slidable anchor 381 engaging a slot 383 in suitable stationary support 385. The stationary support 385 will ordinarily be connected with the section, such as spoke 33 or cross bars 37 and 39, as by bolting or welding. The embodiment of FIGS. 17-19 also uses the same protrusion 171 and slot, or groove, 173 to effect the radial inward retraction of the respective pieces 79 before the retracted expansible mandrel 75 is removed from the conduit 41. As illustrated in FIG. 19, a receiving mold, or bell jig, 103 is employed similarly as described hereinbefore.

As implied from the descriptive matter hereinbefore, the expansible mandrel 75 is inserted into the conduit 41 and the anchor 381 engages the slot 383 at the same time. Thus, the anchor 381 prevents rotation of the expansible mandrel 75 and the swage 95. Yet, the swage 95 is moved radially inwardly longitudinally of the threaded shaft 137 to expand the respective pieces 79 radially outwardly, sliding down the shaft of the anchor 381 by its keyway 393.

In the embodiment of FIGS. 17-19, the respective limit switches delineated hereinbefore may be employed. I have found it advantageous, however, to employ a current limiting motor to simply drive the shaft 137 to seat the swage 95 on the seat 143 and to hold it there as long as desired. Such current limiting motors are conventionally available and need not be described in detail herein. It is sufficient to note that they do not over heat but obviate the necessity for relatively more elaborate controls. It is advantageous to employ such motors since they conventionally have materials of construction that resist the high temperatures attendant to heating the conduit to its softening temperature; for example, from 350°–500° F.

The embodiment of FIGS. 17-19 is employed with the respective plugging sectors 351, similarly as described with respect to FIGS. 15 and 16. In fact, the use of the expansible bag for moving the plugging sectors 351 into position becomes simpler when no parallel linkages 347 are employed. If employed with rotation of the mandrel 75 per the embodiment of FIGS. 1–13, the support 385 must be rotatably mounted and means supplied for moving it through the angle α, following reversal of the motor and withdrawal of the swage 95.

Operationally, the base 123 sealingly engages the conduit 41 so that the superatmospheric pressure is maintained for the simultaneous precision bending of the heated conduit 41, such as described hereinbefore.

From the foregoing description and drawings, it becomes apparent that a variety of different structures may be employed in the respective apparatus sub-assemblies. For example, the forcing means 97 may comprise a tubular shaft 139, with or without means M on the collar of the shaft 137, FIG. 9; or it may comprise the respective rotating threaded shaft 137 with an interiorly threaded aperture in the swage 95, coupled with the anchor 381, FIG. 17.

Similarly, the smoothing means 99 may comprise means; such as, the motor and gear 159 and 87; for rotating the expansible mandrel, with or without a slight retraction and a second expansion outwardly, to smooth out the interior finish of the belled end 71; or it may comprise the plugging sectors 351 and the expansion and retraction means 355 of FIGS. 14–16. Also, the mounting means 81 may comprise, respectively, the pivotal fulcrum shaft 117, the bracket 121 and the bifurcated end 119 for the pivotally mounted pieces 79 of FIGS. 8 and 9; the parallelogram linkage 347 of FIGS. 14–16; or the rider 371, track 373, and base 123 of FIGS. 17–19.

A cyclindrical belled end 71 has been described hereinbefore for receiving the cylindrical second end of the conduit, since sealing is more easily maintained during expansion and contraction. If desired, the second end may be slightly frusto-conical with from 1°–3° of conical shaping imparted thereto; and the belled end 71 have a conformingly inverted frusto-conical shape for conformingly receiving the conical shaped end 73. Any other desired shape and conformingly receiving shape can be employed for, respectively, the belled end 71 and the other end 73 of the conduit 41.

While a ridge 127 and groove 129 having respective right angles of 90° have been described hereinbefore, the grooves may have any desired cross sectional shape. Of course, the ridge will have an exterior shape designed to effect the interior shape of the groove.

While a shoulder 141 and slight seat 143 have been described hereinbefore to prevent overexpanding of the pieces 27, a confining means may be employed to limit the outward movement of the respective pieces 27 to prevent overexpansion. Overexpansion is ordinarily not a problem where the mounting means limits the degree of movement, but is required where the pieces 27 pivot freely without a limit means to limit the outer degree of pivoting. If desired, of course, the limit means may comprise respective co-engaging limits on the bifurcated end 119 and the bracket 121 of FIG. 1.

As noted in the aforementioned application Ser. No. 349,293, any degree of automation may be employed.

In the embodiments, the use of an expansible bag 361 has been described in the expansion and retraction means 355. Instead of the expansible bag 361, suitably eccentrically mounted linkages may be employed for effecting expansion of the plugging sectors 351 radially outwardly upon rotation of a master cam or the like to which the shafts 363 are connected. Any other suitable expansion and retraction means may be employed for the expansion and retraction means 355. The expansible bag 361 has the merit that it is simple to install within the expansible mandrel. The retraction, or collapse, of the expansible bag is enhanced by the use of quick opening valves in connection with a suitable suction device, such as a partially evacuated vessel.

In the embodiment of FIGS. 17–19, use of rotary cams to drive the respective plugging sectors 351 outwardly via their shafts 363 is advantageous. That is, the incoming swage 95 can be employed to free a rotary cam such that it can rotate to move the respective shafts 363 and plugging sectors 351 outwardly after the respective pieces are moved substantially completely radially outward. Conversely, the plugging sectors 351 will be withdrawn on the first rotational motion of the shaft 137 in the opposite direction, being retracted much more rapidly than will the pieces 79 which are retracted by the much more slowly moving swage 95.

To ensure that the surfaces of the belled end 71 are not distorted by sticking, the respective engaging surfaces of the pieces 79, shells 181 and 183 and the like may be treated with suitable materials to resist sticking the plastic of the belled end. For example, respective surfaces may be treated with a fluorocarbon, such as Teflon; or they may be sprayed periodically with a silicone, high temperature lubricant, or other similar material.

Use of a swage 95 with the protrusion and groove has been described hereinbefore for the means for effecting expansion and retraction of the plurality of pieces 79 for forming the belled end 71. Any other suitable means can be employed for effecting the radially outward expansion and the inward contraction as long as the means can perform within the limitations described hereinbefore. For example, a radially outwardly expansible bag or cylinder and piston arrangement can be employed. On the other hand, suitable camming surface may be employed to effect the radially outward expansion of the pieces 79; with suitable retracting protrusion and grooves, similar to those described for effecting retraction.

While separate clamps, such as clamp 43 and the bell jig comprising tubular shells 183 and 181 have been described, a unitary clamp and bell jig can be employed, since they are opened and closed at the same loading and unloading location for removal of a bent and belled elbow and insertion of a new piece of conduit 41. If desired, the pivotally mounted end of the jig 47 may be movable in order to facilitate insertion of the conduit, similarly as described with respect to the shell 181.

The tubular shells 181 and 183 may be moved into place about the end 71 of the conduit 41 as described. On the other hand, tubular shells may be permanently emplaced at a given location and the conduit slid longitudinally therethrough if this inconvenience can be tolerated.

While the use of the switch 145 with the back side contacts has been described hereinbefore to ensure that the swage 95 is fully inserted before the expansible mandrel is rotated, position cams may be employed to effect movement of the valves 345 or the like. There is plenty of time to effect the automatic belling, since the bending proceeds more slowly so such cams can be properly affixed to the hood 13 or the like to effect movement of the valve 345 for the respective insertion and withdrawal of the swage, rotation of the mandrel and re-insertion of the swage by appropriate limit switches.

As the swage 95 is withdrawn at the loading and unloading location, the limit switch 145 is released, causing the energizing of the delay 347. Following suitable elapsed time interval, the motor 159 is reversed to return the retractable mandrel to its original position. If desired, this step of reversing the motor can be delayed and the rotation of the motor will be effected in the opposite direction in the next cycle and the opposite limit switch 167 will be energized to stop the rotation through the angle $\alpha$ in the opposite direction. In any event, the motor 159 is operated alternately in its respective directions of rotation through a start-reverse control switch connected with the delay 347.

The motor 159 is waterproof in order that it can be safely submerged if necessary.

While a motor 159 has been described hereinbefore eo effect rotation of the expansible mandrel, the expansible mandrel may be rotated by suitable fluid powered ram connected with a lever and operable through a predetermined arc having the respective limit switches 165 and 167 at the extremity of the arc.

It is to be understood that the elements and components are constructed of materials sufficient to withstand the hot and cool temperatures provided by the heating lamps 200 and the chilled water applied to the lower portion of the tank 11. For example, the conduits may be made of fluorocarbons; such as Teflon; to withstand the heat but remain flexible enough to allow the various members to move sufficiently to carry out the bending operation as described previously. If desired, metallic tubing with universal couplings may be employed to obtain the requisite flexibility of interconnection.

Although heat lamps are shown as the heating means, this invention may employ any other heating means, such as electrical heating elements or circulating hot fluids. Particularly, other embodiments employing advantageous circulating hot fluids are described in U.S. Pat. No. 3,753,635, the disclosure of which is embodied herein by reference with respect to the details for employing such circulating hot fluids. As will be appreciated, those embodiments can be employed herein, since the provisions for circulating the hot fluid exist in the respective conduits and passageways through the expansible mandrel 75 and the cap 32 herein.

Moreover, the embodiments in which the wheel 15 is modified to rotate in a horizontal plane around a vertical axis is described in U.S. Pat. No. 3,753,635 and that descriptive material is embodied herein by reference; since those embodiments will also be employable in this invention.

Although not shown, it will be understood that the electrical system employed will be properly insulated in all of the embodiments to prevent shock to the operators. Moreover, the electrical components are close to the axle 31 and away from water bath or water sprays.

It is to be understood that plastic conduits of different size and cross sectional configurations may be bent by employing clamps, jigs, mandrels and caps of different sizes and configurations. In fact, the invention has the flexibility that different sizes and/or cross sectional configurations of respective clamps, jigs, mandrels and caps can be employed in the respective sections simultaneously. This feature, in conjunction with preheating to obtain desired cycle times, enables production scheduling as desired. In addition, different degrees of bend and different types of bend (i.e., sharp or smooth) may be obtained by employing the desired types of jigs 47 and 49. The system is constructed whereby clamps and jigs may be readily removed and substituted as needs change. Also, the adjustable stop 94A may be readily positioned for holding the clamp 45 at a position that is equivalent to the precisely desired degree of bend in the elbow.

The belling of only one end of the elbow has been described. Both may be belled by the substitution of a second expansible mandrel and its operating means for the cap 32.

Hereinbefore each section has been described as having its individual ram 105 for inserting and withdrawing the expansible mandrel. If desired, the ram 105 or similar means may be stationarily mounted and the shaft 137 held in place on the respective sections by respective clamps and locks that are emplaced once the mandrel 75 has been inserted within the conduit 41.

In accordance with the foregoing description, it can be seen that this invention provides method and apparatus for effecting automatic production of precisely formed elbows having a high quality belled end and a high degree of quality control on the bend achieved. As indicated hereinbefore, the quality control includes not only the desired degree of bend, but also obtaining the desired shape, without wrinkling of the elbow along the inside bend and obtaining a sealing bell that can be sealed with the other end of the conduit. Specifically, the objects of this invention are accomplished by a method of at least sem-automatically and in a single operation, substantially simultaneously (1) bending precut segments of conduit to form elbows and (2) belling the ends of the elbows, comprising the steps of:

a. inserting an expansible belling mandrel into an end of one of the segments of conduit to be belled to sealingly engage the end of the segment;

b. injecting a fluid under controlled superatmospheric pressure to establish a superatmospheric pressure within the conduit to effect a differential pressure across its walls;

c. heating said segment of conduit to its softening temperature intermediate its ends along the length sufficient to form an arc of a predetermined degree and radius of bend and heating said at least one end to its softening temperature for belling thereof;

d. at least semi-automatically expanding said expansible mandrel and said end of said conduit at its softening temperature to form a belled end and providing a desired finish to the interior of said belled end; said belled end being adapted to sealingly engage a co-engaging end of conduit inserted therewithin;

e. retaining said belling mandrel in sealing engagement with said belled end of said conduit; f. at least semi-automatically bending said conduit at its softening temperature while maintaining said pressure differential across its walls to said predetermined degree and radius of bend in conformance with a jig means to form a precision elbow with a minimum of distortion of its side walls because of said differential pressure thereacross;

g. cooling said precision elbow while maintaining said belled end, said differential pressure and said conformance to said predetermined degree and radius of bend; and h. equalizing the pressure, releasing and removing said belling mandrel, and releasing said elbow from conforming engagement with said jig means.

In order to carry out the invention, the following apparatus is employed. First, a sealing expansible belling mandrel is employed for forming the belled end and simultaneously maintaining pressure for a precision bend. An insert means is employed for inserting the belling mandrel into the conduit to sealingly engage the end of the conduit. The retaining means is provided for retaining the belling mandrel in sealing engagement with the end of the conduit. A pressurizing means is provided for injecting fluid under controlled superatmospheric pressure to establish a a superatmospheric pressure within the conduit to form a differential pressure across its walls. A heating means is provided for heating the segment of the conduit to its softening temperature. An expanding means is provided for expanding the expansible mandrel and the end of the conduit at its softening temperature to form a belled end that is adapted to sealingly receive a co-engaging end of a conduit inserted therewithin. A bending means is provided for bending the conduit at its softening temperature while maintaining the pressure differential across is walls. Jig means define the shape of the bell and bend precisely. The bending means is adapted to at least semi-automatically bend the conduit to a predetermined degree and radius of bend in conformance with the jig means to form a precision elbow with a minimum of distortion of its side walls since it has differential pressure thereacross. A cooling means cools the precision elbow while maintaining a differential pressure and conformance to the jig means, including the bell jig. Equalizing and releasing means are provided for equalizing the pressure across the walls of the conduit, for releasing and moving the belling mandrel and for releasing the elbow from conforming engagement with the jig means.

Thus, this invention accomplishes its purposes and its objects and alleviates the disadvantages of the prior art.

Although this invention has been described with a certain degree of particularity, it is understood that the present disclosure has been made only by way of example and that numerous changes in the details of construction and the combination and arrangement of parts may be resorted to without departing from the spirit and the scope of this invention.

What is claimed is:

1. Apparatus for at least semi-automatically (1) bending pre-cut segments of conduit to form elbows and (2) belling the ends of the elbows comprising:
    a. expansible belling mandrel and insert means for inserting said belling mandrel into said conduit to sealingly engage said end of said conduit;
    b. retaining means for retaining said belling mandrel in sealing engagement with said end of said conduit;
    c. pressurizing means for injecting a fluid under a controlled superatmospheric pressure to establish a superatmospheric pressure within said conduit to form a differential pressure across its walls;
    d. heating means for heating said segment of conduit to its softening temperature;
    e. expanding means for expanding said mandrel and said end at its softening temperature to form a belled end that is adapted for sealingly receiving a co-engaging end of said conduit inserted therewithin;
    f. jig means and bending means for bending said conduit at its softening temperature while maintaining said pressure differential across its walls; said bending means being adapted to at least semi-automatically bend the said conduit to said predetermined degree and radius of bend in conformance with said jig means to form a precision elbow with a minimum of distortion of its side walls because of the differential pressure thereacross;
    g. cooling means for cooling said precision elbow while maintaining said differential pressure and said conformance to said jig means; and
    h. an equalizing and releasing means for equalizing the pressure across the walls of the conduit, for releasing and removing said belling mandrel and for releasing said elbow from comforming engagement with said jig means.

2. The apparatus of claim 1 wherein:
    a. said heating means is positioned at a heating location through which said conduit is passed to heat said segment of conduit to its softening temperature;
    b. said cooling means is positioned at a second location through which said elbow is passed to cool said elbow; and
    c. moving means is provided for moving said segment of conduit through said heating and cooling locations; said pressurizing means for injecting said fluid being adapted to remain connected with said segment of conduit throughout its traverse and throughout operation of said heating and cooling means.

3. The apparatus of claim 1 wherein said pressurizing means a includes an external supply of fluid at superatmospheric pressure and said expansible mandrel comprises:
    a. a plurality of at least three pieces having a predetermined peripheral radius of curvature that is the same as said second end of said conduit;
    b. mounting means holding said plurality of pieces assembled and adapted for allowing radially outward expansion thereof;
    c. a central bore having a first frusto-conically shaped bore opposite said mounting means for receiving a swage means;
    d. a central shaft disposed in said central bore and extending out of said frusto-conically shaped bore; said central shaft having a passageway extending longitudinally therethrough for conducting a fluid interiorly of said conduit and connected with said external supply of said fluid;
    e. swage means disposed on said central shaft and movable longitudinally thereof for expanding said plurality of pieces radially outward, said swage means having a frusto-conical shape adapted to conformingly fit said frusto-conically shaped bore when fully seated thereinto for forming the belled first end;
    f. forcing means for forcing relative movement between said swage means and said pieces to fully seat said swage means in and withdraw said swage means from said frusto-conically shaped bore; said forcing means being connected with said swage means and said mounting means for effecting the relative movement therebetween;

g. smoothing means for smoothing out the interior surface of the final belled end and removing irregularities caused by normal discontinuities of the expansibly mounted pieces when they are expanded outwardly into their fully expanded position by the fully seated swage means; and h. retraction means for effecting retraction of said pieces radially inwardly as said swage means is withdrawn from its fully seated position.

4. The apparatus of claim 3 wherein said plurality of pieces of said expansible mandrel have a ridge extending peripherally thereabout for forming a groove in the belled first end for receiving a seal means for sealing against a second end that is inserted thereinto.

5. The apparatus of claim 3 wherein a receiving mold is provided; said receiving mold comprising a pair of tubular shells that conformingly fit together laterally to define an internal cavity of the desired shape and dimension; and wherein a means is provided for moving said pair of tubular shells laterally together for receiving a belled end and moving them apart to free said belled end.

6. The apparatus of claim 3 wherein said mounting means comprises a pivotal mounting for each of said pieces and said pieces pivot outwardly to accurately define said belled end in their fully expanded position.

7. The apparatus of claim 3 wherein said mounting means comprises respective track means and riders movable longitudinally thereof and said pieces move longitudinally of said track means radially outwardly into their fully expanded position.

8. The apparatus of claim 3 wherein said mounting means comprise respective parallelogram linkages such that said pieces retain their same relative orientation parallel to their central longitudinal axis as they are moved radially inwardly and outwardly.

9. The apparatus of claim 3 wherein said smoothing means comprises means for rotating said mandrel through a predetermined number of degrees.

10. The apparatus of claim 3 wherein said smoothing means comprises the same plurality of plugging sectors that are movable outwardly into the respective gaps between said plurality of pieces when said pieces are expanded radially outwardly into their fully expanded position by the fully seated swage means; said plugging sectors being retractable inwardly into recesses before said pieces are retracted radially inwardly to their retracted position; and expansion and retraction means for expanding and retracting said plugging sectors.

11. Apparatus for precision belling and bending of plastic conduit comprising:

a. a rotatable means for moving a segment of conduit through a plurality of locations for carrying out a variety of cooperating functions, said rotatable means having a plurality of sections, the plurality being at least as great as the number of locations; each section including:

i. pressurizing means for establishing a superatmospheric pressure within a segment of conduit, said pressurizing means being connected with a pressurized source of fluid having a pressure regulating means and including an expansible sealing belling mandrel for sealing emplacement at one end and another means for sealing emplacement at another end of said segment of conduit for controlling flow of fluid at each end of said segment of conduit; said pressurizing means being operable to maintain the superatmospheric pressure throughout said plurality of locations after said belling mandrel has been sealingly inserted within said end of said conduit and as said rotatable means is rotated through said plurality of locations;

ii. clamping means for clamping each end of said segment of conduit, said clamping means having a fixed portion that is fixedly carried by said section and a movable portion that is movable along a predetermined arcuate path so as to effect a desired degree of bend and desired shape of said segment of conduit;

iii. jig means having an interior wall of a desired finish for effecting an elbow having a desired finished surface;

iv. belling mandrel and inserting means for inserting said belling mandrel into said conduit to sealingly engage the end of said conduit and form said belled end; said belled end being adapted to sealingly receive a co-engaging end of said conduit that is inserted therewithin;

v. automatic bending means connected with said movable portion of said clamping means for bending said segment of conduit responsive to an actuation means, said bending means having holding means for holding a desired degree of bend once attained;

vi. stop means for limiting the degree of bending that is automatically effected by said bending means; and vii. expanding means for expanding said expansible mandrel and forming said belled end;

b. loading and unloading location for emplacing said segment of conduit within said clamping means and in alignment with said belling mandrel in a section and connecting said pressurizing means and for releasing said pressurizing means and said belling mandrel and taking a formed elbow from said clamping means; said loading and unloading location in combination with each said section including:

i. means for releasing the pressure from within said conduit and disconnecting said pressurizing means therefrom;

ii. release means for releasing and effecting withdrawal of said belling mandrel;

iii. means for releasing, respectively, said holding means, said bending means, and said clamping means for taking a formed elbow therefrom;

iv. means for re-connecting said pressurizing means with a subsequent condition for establishing pressure therewithin; and aligning said conduit with said belling mandrel for another throughput; means for inserting said belling mandrel into said conduit to sealingly engage the interior walls thereof; and v. means for effecting operation of said pressurizing means to inject said fluid and effect a differential pressure across the walls of said segment of conduit;

c. heating location including heating means disposed peripherally downstream of said loading and unloading location for heating said segment of conduit intermediate its ends along a sufficient distance to form an elbow of the desired radius and for heating said end in which said expansible mandrel is inserted; said heating being effected to the softening temperature of said conduit;

d. heating, belling and bending location disposed peripherally downstream of said heating location for belling said end of said conduit to a precision belled end and for bending the segment of said conduit at its softening temperature to a precision elbow; said heating and bending location including:
  i. second heating means for maintaining said segment of conduit at its softening temperature; and
  ii. actuation means for automatically actuating said bending means to bend the softened segment of conduit into conformance with said jig means and said stop means and into a precise degree of bend and shape and simultaneously actuating expanding of said expansible mandrel for forming said belled end; and e. at least one cooling location having means for subjecting said precision elbow to a cooling fluid to cool it below its softening temperature and into a flexible state before it reaches said loading and unloading location.

12. The apparatus of claim 11 wherein said pressurizing means includes an external supply of fluid at superatmospheric pressure and said expansible mandrel comprises:
  a. a plurality of at least three pieces having a predetermined peripheral radius of curvature that is the same as said second end of said conduit;
  b. mounting means holding said plurality of pieces assembled and adapted for allowing radially outward expansion thereof;
  c. a central bore having a first frusto-conically shaped bore opposite said mounting means for receiving a swage means;
  d. a central shaft disposed in said central bore and extending out of said frusto-conically shaped bore; said central shaft having a passageway extending longitudinally therethrough for conducting a fluid interiorly of said conduit and connected with said external supply of said fluid;
  e. swage means disposed on said central shaft and movable longitudinally thereof for expanding said plurality of pieces radially outward, said swage means having a frusto-conical shape adapted to conformingly fit said frusto-conically shaped bore when fully seated thereinto for forming the belled first end;
  f. forcing means for forcing relative movement between said swage means and said pieces to fully seat said swage means in and withdraw said swage means from said frusto-conically shaped bore; said forcing means being connected with said swage means and said mounting means for effecting the relative movement therebetween;
  g. smoothing means for smoothing out the interior surface of the final belled end and removing irregularities caused by normal discontinuities of the expansibly mounted pieces when they are expanded outwardly into their fully expanded position by the fully seated swage means; and
  h. retraction means for effecting retraction of said pieces radially inwardly as said swage means is withdrawn from its fully seated position.

13. The apparatus of claim 11 wherein said plurality of pieces of said expansible mandrel have a ridge extending peripherally thereabout for forming a groove in the belled first end for receiving a seal means for sealing against a second end that is inserted thereinto.

14. The apparatus of claim 11 wherein a receiving mold is provided; said receiving mold comprising a pair of tubular shells that conformingly fit together laterally to define an internal cavity of the desired shape and dimension; and wherein a means is provided for moving said pair of tubular shells laterally together for receiving a belled end and moving them apart to free said belled end.

15. The apparatus of claim 11 wherein said mounting means comprises a pivotal mounting for each of said pieces and said pieces pivot outwardly of accurately define said belled end in their fully expanded position.

16. The apparatus of claim 11 wherein said mounting means comprises respective track means and riders movable longitudinally thereof and said pieces move longitudinally of said track means radially outwardly into their fully expanded position.

17. The apparatus of claim 11 wherein said mounting means comprises respective parallelogram linkages such that said pieces retain their same relative orientation parallel to their central longitudinal axis as they are moved radially inwardly and outwardly.

18. The apparatus of claim 11 wherein said smoothing means comprises means for rotating said mandrel through a predetermined number of degrees.

19. The apparatus of claim 11 wherein said smoothing means comprises the same plurality of plugging sectors that are movable outwardly into the respective gaps between said plurality of pieces when said pieces are expanded radially outwardly into their fully expanded position by the fully seated swage means; said plugging sectors being retractable inwardly into recesses before said pieces are retracted radially inwardly to their retracted position; and expansion and retraction means for expanding and retracting said plugging sectors.

* * * * *